(12) United States Patent
Abbott et al.

(10) Patent No.: US 12,722,272 B2
(45) Date of Patent: Sep. 1, 2026

(54) IDENTIFYING POWER TOOL DEVICES BASED ON SOUND GENERATED BY ELECTRONIC COMPONENTS OF THE POWER TOOL DEVICES

(71) Applicant: Milwaukee Electric Tool Corporation, Brookfield, WI (US)

(72) Inventors: Jonathan E. Abbott, Milwaukee, WI (US); Randolph H. McHugh, Sullivan, WI (US); Mark A. Gellings, Colgate, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 18/834,587

(22) PCT Filed: Jan. 31, 2023

(86) PCT No.: PCT/US2023/061665
§ 371 (c)(1),
(2) Date: Jul. 30, 2024

(87) PCT Pub. No.: WO2023/147592
PCT Pub. Date: Aug. 3, 2023

(65) Prior Publication Data

US 2025/0153334 A1 May 15, 2025

Related U.S. Application Data

(60) Provisional application No. 63/304,992, filed on Jan. 31, 2022.

(51) Int. Cl.

| | |
|---|---|
| ***B25F 5/02*** | (2006.01) |
| ***B25B 21/00*** | (2006.01) |
| ***G01M 7/02*** | (2006.01) |

(52) U.S. Cl.
CPC .............. *B25F 5/02* (2013.01); *B25B 21/002* (2013.01); *G01M 7/022* (2013.01); *G01M 7/025* (2013.01)

(58) Field of Classification Search
CPC ................................. B25F 5/02; B25B 21/002
See application file for complete search history.

(56) References Cited

U.S. PATENT DOCUMENTS 6,260,427 B1 7/2001 Jones et al.
6,536,536 B1 * 3/2003 Gass ...................... B25F 5/021 173/171

(Continued)

FOREIGN PATENT DOCUMENTS

CN 118393861 A 7/2024
CN 118393862 A 7/2024

(Continued)

OTHER PUBLICATIONS

T. Perkovic, et al., Wireless Communications and Mobile Computing, vol. 2018, Article ID 8523078, https://doi.org/10.1155/2018/8523078, published Jun. 7, 2018, 17 pages.

*Primary Examiner* — Michelle Lopez
(74) *Attorney, Agent, or Firm* — Quarles & Brady LLP

(57) ABSTRACT

A power tool device (102) is controlled to emit sounds that can identify the power tool device and/or be used to encode data for acoustic data transmission. Modulating the switching frequency of electronic components (370) (e.g., transistors, semiconductor switched devices) of the power tool device (102) can create an acoustic signature detectable by a microphone-equipped device (104), such as a cell phone, tablet, security camera, or the like. In this way, power tool identification and/or acoustic data transmission can be realized with existing power tool device circuitry and hardware components.

24 Claims, 8 Drawing Sheets

(56) References Cited

U.S. PATENT DOCUMENTS 11,366,457 B1 6/2022 George et al.
2003/0037423 A1 2/2003 Siegel
2005/0167130 A1 8/2005 Setter et al.
2006/0289183 A1 12/2006 Schreiber
2008/0021590 A1 1/2008 Vanko et al.
2010/0114358 A1 5/2010 Krapf et al.
2013/0187587 A1 7/2013 Knight et al.
2013/0327552 A1 12/2013 Lovelass et al.
2014/0338939 A1 11/2014 Shi
2014/0367134 A1 12/2014 Phillips et al.
2015/0101835 A1 4/2015 Nitsche et al.
2015/0178620 A1 6/2015 Ascari et al.
2016/0000025 A1 1/2016 Hamann et al.
2016/0342142 A1 11/2016 Boeck et al.
2016/0361069 A1 12/2016 Ardel et al.
2016/0375570 A1 12/2016 Boeck et al.
2017/0090430 A1 3/2017 Nakazawa
2018/0328797 A1 11/2018 Gwon et al.
2018/0331768 A1 11/2018 Szell
2019/0187659 A1 6/2019 Li et al.
2019/0227528 A1 7/2019 Abbott et al.
2020/0156210 A1 5/2020 Sullivan et al.
2020/0160152 A1 5/2020 Buttner et al.
2020/0267903 A1 8/2020 Gao et al.
2020/0276680 A1 9/2020 Green et al.
2020/0326718 A1 10/2020 Kandemir et al.
2020/0338677 A1 10/2020 Ozeki
2020/0384618 A1 12/2020 Tanji et al.
2021/0053212 A1 2/2021 Haetty
2021/0101263 A1 4/2021 Hwang et al.
2021/0101304 A1 4/2021 Green et al.
2021/0104006 A1 4/2021 Green
2021/0116894 A1 4/2021 Wichern et al.
2021/0157297 A1 5/2021 Kaiser et al.
2021/0166154 A1 6/2021 Ogino
2021/0192386 A1 6/2021 Cabrita et al.
2021/0205976 A1 7/2021 Matei
2021/0240145 A1 8/2021 Abbott
2021/0283759 A1* 9/2021 Merget ...................... F16P 3/12
2021/0302921 A1 9/2021 Kolter et al.
2021/0312262 A1 10/2021 Postel
2021/0326663 A1 10/2021 Winston et al.
2021/0374549 A1 12/2021 Willmott et al.
2021/0383234 A1 12/2021 Bai et al.
2021/0393337 A1 12/2021 Zucker
2021/0394344 A1 12/2021 Mueckl et al.
2022/0019900 A1 1/2022 Wong et al.
2022/0050023 A1 2/2022 Lavazais et al.
2022/0067913 A1 3/2022 Lutz et al.
2022/0092466 A1 3/2022 Carbrita et al.
2022/0100850 A1 3/2022 Sun et al.
2022/0101116 A1 3/2022 Sheikholeslami et al.
2022/0101143 A1 3/2022 Rice et al.
2022/0108132 A1 4/2022 Zhang et al.
2022/0111496 A1 4/2022 Beacham, Jr. et al.
2022/0118595 A1 4/2022 Abbott et al.
2022/0121177 A1 4/2022 Kerwin
2022/0138510 A1 5/2022 Dai et al.
2022/0138511 A1 5/2022 Xu et al.
2022/0172061 A1 6/2022 Willmott et al.
2022/0197227 A1 6/2022 Woehlke et al.
2022/0261618 A1 8/2022 Garcia et al.
2022/0266429 A1 8/2022 Erbele et al.
2022/0292349 A1 9/2022 Stoll et al.
2022/0299946 A1 9/2022 Abbott et al.
2022/0313374 A1 10/2022 Jacobsen et al.
2022/0318616 A1 10/2022 Kamble et al.
2022/0347811 A1 11/2022 Abbott et al.
2022/0405648 A1 12/2022 Lin et al.
2022/0407274 A1 12/2022 Radtke et al.
2022/0410360 A1 12/2022 Erbele et al.
2023/0039379 A1 2/2023 Schmidt
2023/0057100 A1 2/2023 Schirmer et al.
2023/0100132 A1 3/2023 Rice et al.
2023/0100765 A1 3/2023 Roderick et al.
2023/0101812 A1 3/2023 Feng et al.
2023/0102866 A1 3/2023 Bai et al.
2023/0107463 A1 4/2023 Baharloui et al.
2023/0107917 A1 4/2023 Pabbaraju et al.
2023/0115313 A1 4/2023 Weber et al.
2023/0115521 A1 4/2023 Kupcsik et al.
2023/0141816 A1 5/2023 Butzerin et al.
2023/0219204 A1 7/2023 Dieter et al.
2023/0251614 A1 8/2023 Lutz et al.
2023/0298315 A1 9/2023 Sheikholeslami et al.
2023/0316067 A1 10/2023 Rudolph et al.
2023/0321796 A1 10/2023 Speckman et al.
2023/0339142 A1 10/2023 Mayer et al.
2023/0356341 A1 11/2023 Volpert
2023/0367269 A1 11/2023 Glennon et al.
2023/0406344 A1 12/2023 Jiang et al.
2024/0020638 A1 1/2024 Adcock et al.
2024/0037282 A1 2/2024 Rice et al.
2024/0037446 A1 2/2024 Vogt et al.
2024/0051107 A1 2/2024 Petersson et al.
2024/0070451 A1 2/2024 Zhang et al.
2024/0096067 A1 3/2024 Mahmud et al.
2024/0104339 A1 3/2024 Norouzzadeh et al.
2024/0112455 A1 4/2024 He et al.
2024/0139916 A1 5/2024 Baskaran et al.
2024/0149411 A1 5/2024 Schuller et al.
2024/0165774 A1 5/2024 Bajpai
2024/0190032 A1 6/2024 Otto et al.
2024/0198475 A1 6/2024 Bralla et al.
2024/0198506 A1 6/2024 Leray et al.
2024/0217082 A1 7/2024 Abbott et al.
2024/0256961 A1 8/2024 Frischen et al.
2024/0265262 A1 8/2024 Elsken et al.
2024/0326223 A1 10/2024 Hayashi et al.
2024/0333179 A1 10/2024 Abbott et al.
2024/0347286 A1 10/2024 Abbott et al.
2024/0367296 A1 11/2024 Nakamura et al.
2024/0369431 A1 11/2024 Tang et al.
2024/0369432 A1 11/2024 Tang et al.
2024/0370774 A1 11/2024 Aldenfalk et al.
2024/0395260 A1 11/2024 Namata et al.

FOREIGN PATENT DOCUMENTS

CN 118393863 A 7/2024
CN 118393864 A 7/2024
CN 118393865 A 7/2024
CN 118393866 A 7/2024
CN 118393867 A 7/2024
CN 118393869 A 7/2024
CN 118393870 A 7/2024
DE 102019131627 A1 5/2021
DE 102020205165 A1 10/2021
DE 102020213080 A1 4/2022
DE 102023200858 A1 8/2024
EP 1398119 A1 3/2004
EP 3623108 A1 3/2020
EP 3587024 A1 7/2020
EP 3716160 A1 9/2020
EP 3770820 A1 1/2021
EP 3772398 A1 2/2021
EP 3913547 A1 11/2021
EP 3950230 A1 2/2022
EP 4357983 A1 4/2024
JP 2012-200807 A 10/2012
JP 2022-153183 A 10/2022
WO 2009/138268 A1 11/2009
WO 2017/162130 A1 9/2017
WO 2020/073955 A1 4/2020
WO 2021/042233 A1 3/2021
WO 2021/060090 A1 4/2021
WO 2021/241111 A1 12/2021
WO 2023/000659 A1 1/2023
WO 2023/049516 A1 3/2023
WO 2023/076385 A2 5/2023
WO 2023/076953 A1 5/2023
WO 2023/076954 A1 5/2023
WO 2023/076955 A1 5/2023
WO 2023/110231 A1 6/2023

(56) References Cited

FOREIGN PATENT DOCUMENTS

| | | | |
|---|---|---|---|
| WO | 2023/180247 | A1 | 9/2023 |
| WO | 2023/186501 | A1 | 10/2023 |
| WO | 2023/217792 | A1 | 11/2023 |
| WO | 2023/222382 | A1 | 11/2023 |
| WO | 2024/044660 | A1 | 2/2024 |
| WO | 2024/099933 | A1 | 5/2024 |
| WO | 2024/140217 | A1 | 7/2024 |
| WO | 2024/156515 | A1 | 8/2024 |

* cited by examiner

IDENTIFYING POWER TOOL DEVICES BASED ON SOUND GENERATED BY ELECTRONIC COMPONENTS OF THE POWER TOOL DEVICES

CROSS-REFERENCE TO RELATED APPLICATIONS

This application represents the national stage entry of PCT/US2023/061665 filed on Jan. 31, 2023 and claims the benefit of U.S. Provisional Patent Application Ser. No. 63/304,992, filed on Jan. 31, 2022, and entitled "IDENTIFYING POWER TOOL DEVICES BASED ON SOUND GENERATED BY ELECTRONIC COMPONENTS OF THE POWER TOOL DEVICES," which is herein incorporated by reference in its entirety.

BACKGROUND

Power tools are typically powered by portable battery packs. These battery packs range in battery chemistry and nominal voltage and can be used to power numerous power tools and electrical devices. A power tool battery charger includes one or more battery charger circuits that are connectable to a power source and operable to charge one or more power tool battery packs connected to the power tool battery charger.

SUMMARY OF THE DISCLOSURE

The present disclosure provides a method for identifying a power tool device based on a switching frequency generated by an electronic component of the power tool device. In operation, the electronic component of the power tool device generates a switching frequency, thereby generating an acoustic signature. The switching frequency may be in an audible frequency range, or may be outside of the audible frequency range. Acoustic signal data are received by an external device by detecting the acoustic signature generated by the electronic component of the power tool device. The received acoustic signal data are then stored in a memory of the external device. In some implementations, the acoustic signal data are processed by the external device to identify the power tool device from which the acoustic signal data were obtained. In some other implementations, the acoustic signal data are transmitted by the external device to a server and the server is configured to process the acoustic signal data to identify the power tool device from which the acoustic signal data were obtained.

In some other aspects, the present disclosure provides a method for transmitting data using a power tool device. Data stored in a memory of the power tool device are transmitted as acoustic signal data by modulating a switching frequency generated by an electronic component of the power tool device, thereby generating an acoustic signature. The acoustic signal data are received by an external device by detecting the acoustic signature generated by the electronic component of the power tool device. The received acoustic signal data are then stored in a memory of the external device.

Implementations may include one or more of the following features.

In some aspects, the power tool device may be a power tool, a power tool battery charger, a battery pack, or other suitable power tool device described below in more detail.

In some other aspects, transmitting the data stored in the memory of the power tool device as acoustic signal data can include accessing the data from the memory of the power tool device, encoding the data using an electronic processor of the power tool device, generating encoded data that include control parameters for modulating the switching frequency generated by the electronic component, and transmitting the acoustic signal data using the electronic processor to modulate the switching frequency generated by the electronic component based on the control parameters in the encoded data, thereby causing the electronic component to emit the acoustic signature.

Encoding the data using the electronic processor may include encoding the data using a binary encoding, or other suitable encoding.

In some aspects, the control parameters can indicate an analog modulation of the switching frequency. In other instances, the control parameters can indicate a digital modulation of the switching frequency. In still other instances, the control parameters can indicate modulating an amplitude of the acoustic signature generated by the electronic component.

The electronic component may include at least one transistor, such as a field-effect transistor ("FET"), which in some aspects may be a metal-oxide-semiconductor field-effect transistor ("MOSFET"). In still other aspects, the electronic component may be a semiconductor switching device, such as a bipolar junction transfer ("BJT"), an insulated-gate bipolar transistor ("IGBT"), a relay, or the like.

The external device generally includes a microphone, and may be a microphone coupled to a mobile device, a security camera, another power tool device, a network hub, or a gateway device.

In some aspects, the electronic component used for acoustic data transmission has a primary function that is different from acoustic data transmission.

In another aspect, the present disclosure provides for a power tool device having a housing and an electronic component housed within the housing. The electronic component includes at least one field-effect transistor ("FET"). The power tool device also includes a memory configured to store power tool device data, and an electronic processor coupled to the electronic component and the memory. The electronic processor is configured to: retrieve the data from the memory; encode the data as acoustic signal data for transmission; and control the electronic component to modulate a switching frequency of the at least one FET in order to emit a sound having an acoustic signature that transmits the acoustic signal data.

Implementations may include one or more of the following features.

In some implementations, the at least one FET is a metal-oxide-semiconductor FET ("MOSFET"). The electronic component may be a bridge for controlling operation of a motor.

BRIEF DESCRIPTION OF THE DRAWINGS

The accompanying drawings, which are incorporated in and form a part of this specification, illustrate embodiments of the disclosure and, together with the description, serve to explain principles of the embodiments.

DETAILED DESCRIPTION

Figure 1:
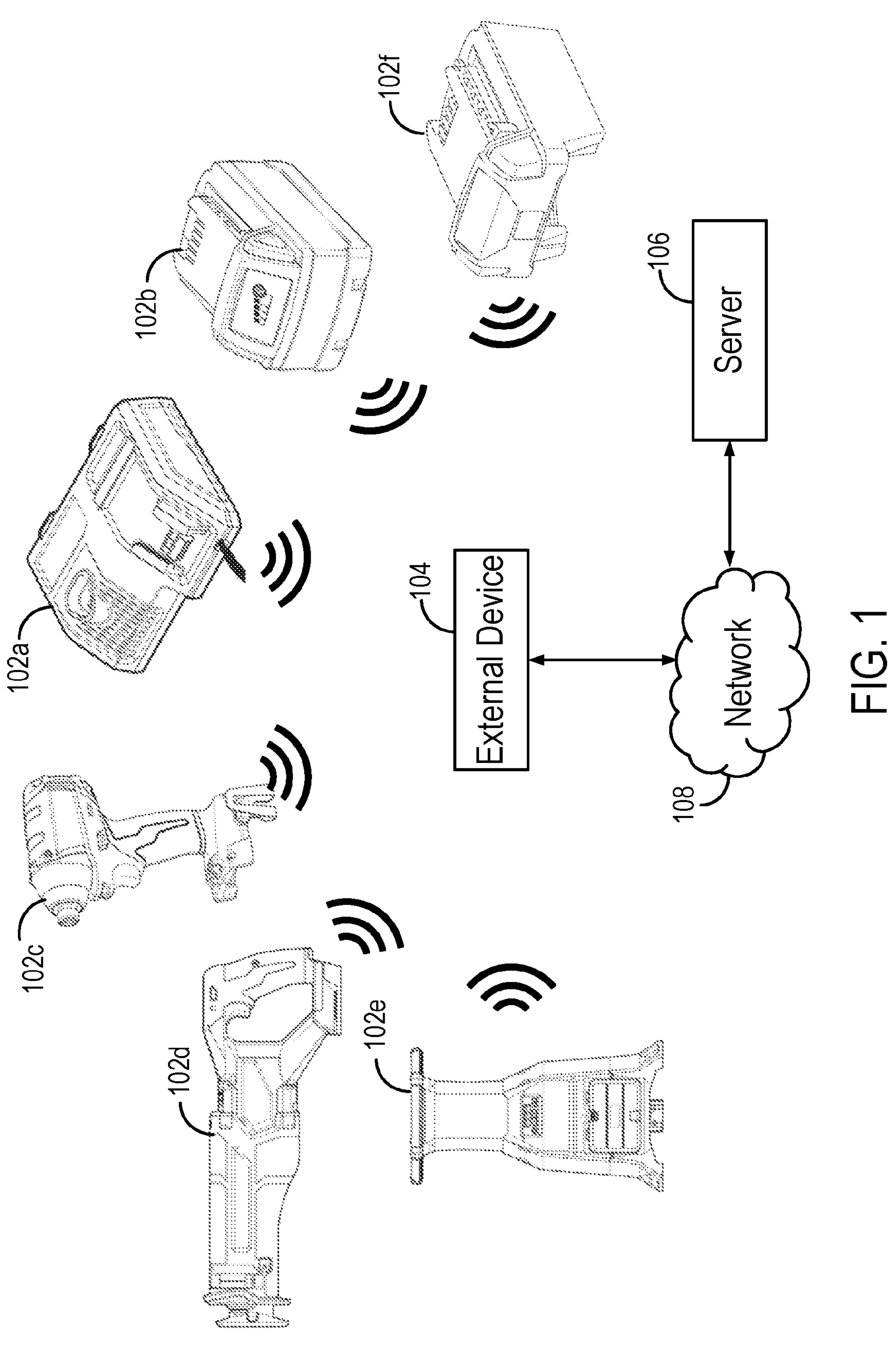
FIG. 1 illustrates an example power tool communication system.

Many power tool devices (e.g., power tools, power tool battery chargers, battery packs, power tool adapters, power supplies (e.g., inverters), lasers (e.g., rotary lasers, point lasers)) are not directly or fully internet-of-things ("IoT") compatible. For example, the power tool devices may lack a Bluetooth®, Wi-Fi®, cellular, NFC, or other wireless transmission means. Some power tool devices may have a wired interface, such as a universal serial bus ("USB") port or dual-function battery interface terminals, that enable data communication, but these require special coupling means (e.g., adapters or USB plugs) to be able to allow such data communication.

Getting power tool device data in the field is useful for various tasks and applications, including but not limited to location tracking of power tool devices, monitoring use of power tool devices, and sending analytics. These tasks are particularly advantageous for helping a digital jobsite and offering value to stakeholders of a jobsite. Often, data transmission requires significant investments in electronic hardware (e.g., Bluetooth®, Wi-Fi®, or cellular). The transmission of such data also may require additional hardware and steps (e.g., pairing a power tool device to a smartphone or other external device), which can be cumbersome for a user.

Described here are various systems and methods in which power tool devices can utilize their existing electronic circuitry to generate sounds in a manner to provide acoustic data transmission to an acoustic detector, such as a microphone on a cell phone, another power tool device, a computer, a security camera, a standalone microphone, or other external device. Cell phones, also referred to as mobile phones or smartphones, are an advantageous device for receiving acoustic data transmission from a power tool device because they usually have a microphone that can detect and record sounds. Cell phones also often have a way to communicate to other systems wirelessly via cellular, Bluetooth®, Wi-Fi®, NFC, and other means. Cell phones also can run software applications (or "apps") that can allow processing of the received acoustic signal data.

In general, the electronic components of a power tool device can generate a switching frequency that creates an acoustic signature. The frequency may be in the audible range, or may be outside of the audible range. The acoustic signature can be unique to different power tool devices; thus, it is an advantage of the systems and methods described in the present disclosure that this acoustic signature can be recorded as acoustic signal data and processed (e.g., by an external device, by a server) to identify the power tool device that generated the acoustic signature. Identifying the power tool device can include identifying the specific power tool device, the type of power tool device, and the like.

Advantageously, the systems and methods described in the present disclosure can also enable any power tool device, including those without radio frequency ("RF")-based wireless communication (e.g., Bluetooth®, Wi-Fi®, cellular) capabilities to wirelessly transmit data to other power tool devices, cell phones, or external devices using the preexisting hardware of the power tool device.

Data that can be transmitted using these acoustic data transmission techniques include power tool device data that may include usage data, maintenance data, feedback data, power source data, sensor data, environmental data, operator data, location data, rental data, among other data that may be associated with a power tool device, such as a power tool, a power tool battery charger, a battery pack, or the like.

Usage data may include usage data for a power tool battery charger, a power tool battery pack, a power tool, or other devices connected to a power tool device network, such as wireless communication devices, control hubs, access points, and/or peripheral devices (e.g., smartphones, tablet computers, laptop computers, portable music players, and the like).

Usage data for a power tool battery charger may include operation time of the power tool battery charger (e.g., how long the power tool battery charger is used in each session, the amount of time between sessions of power tool battery charger usage, and the like), times of day when battery packs are being put on and/or taken off of the power tool battery charger, unique identifiers of battery packs being put on and/or taken off of the power tool battery charger, specific hours when work is being performed on a jobsite (or being performed more or less frequently on the jobsite), days of the week when work is being performed on a jobsite (or being performed more or less frequently on the jobsite), charging patterns, and the like. In some embodiments, usage data may include data indicating the order in which batteries are put on a power tool battery charger with multiple charging ports, or on power tool battery chargers in a network of connected (e.g., wired or wirelessly) power tool battery chargers.

Usage data for a battery pack may include operation time of the battery pack (e.g., how long the battery pack is used in each session, the amount of time between sessions of battery pack usage, and the like), the types of power tool(s) on which the battery pack is being used, the frequency with which the battery pack is being used, the frequency with which the battery pack is being used with a particular power tool or power tool type, the frequency with which the battery pack is charged on a particular power tool battery charger or power tool battery charger type, the current charge capacity of the battery pack (e.g., the state of charge of the battery pack), the number of charge cycles the battery pack has gone through, the estimated remaining useful life of the battery pack, and the like. In some embodiments, usage data may include data indicating the usage of a particular battery.

Usage data for a power tool may include the operation time of the power tool (e.g., how long the power tool is used in each session, the amount of time between sessions of power tool usage, and the like); whether a particular battery pack is used with the power tool and/or the frequency with which the particular battery pack is used with the power tool;

whether a particular battery pack type is used with the power tool and/or the frequency with which the particular battery pack is used with the power tool; the type of power tool applications the power tool is frequently used for; information regarding changes in bits, blades, or other accessory devices for the power tool; and the like.

More generally, usage data for a power tool device (e.g., a power tool, a battery pack, a power tool battery charger, a power supply, a power tool pack adapter, etc.) can include summary data on the usage of the power tool device. As an example, summary data may include application classifications, statistics (e.g., use statistics), on-time, time since last use, and so on.

Maintenance data may include maintenance data for a power tool battery charger, a power tool battery, and/or a power tool. For example, maintenance data may include a log of prior maintenance, suggestions for future maintenance, and the like.

Feedback data may include data indicating the manner in which a power tool device (e.g., a battery pack and/or power tool) is put on a power tool pack adapter, such as how forcefully the power tool device is put on the power tool pack adapter, whether a prolonged force is applied when placing the power tool device on the power tool pack adapter, whether the power tool device is rapidly and repeatedly put on and taken off of the power tool pack adapter, whether the power tool device is placed on the power tool pack adapter shortly after being taken off the power tool pack adapter, and the like. For example, a bounce detector may detect if a power tool device is placed smoothly or with high speed or high force on a power tool pack adapter. While a debounce logic is usually made to avoid the bouncing characteristic of electrical contacts, the contact/disconnect/reconnect logic can be used as a feedback and/or direct command on operation of the connected power tool device and/or the power tool pack adapter. In some embodiments, the feedback data may include data associated with a charging port that has a mechanical means of detecting user force or prolonged force. For instance, a load cell, strain sensor, spring, or biased charging port with a sensing for depression may be used as feedback or a direct command to a power tool pack adapter.

Power source data may include data indicating a type of power source (e.g., AC power source, DC power source, battery power source), a type of electricity input of the power source (e.g., 120 V wall outlet, 220 V wall outlet, solar power, gas inverter, wireless charger, another power tool battery pack, another power tool battery charger, an internal battery, a supercapacitor, an internal energy storage device, a vehicle), a cost of the electricity input of the power source, and the like.

In some embodiments, the power source data can include data indicating electrical characteristics or properties of the electrical grid or circuit associated with the power source. For example, the power source data can include data indicating whether the electrical grid is balanced. As another example, the power source data can include data indicating whether circuit breakers on the electrical circuit local to the power source are likely to be tripped. For instance, the power source data may include voltage curves that can be analyzed to predict when a breaker might trip, among other uses. Additionally or alternatively, the power source data can include current and/or phase angle data, which may be analyzed to predict when a breaker might trip, among other uses. As still another example, the power source data can include data indicating other characteristics of the power source, such as when the power source supplies power in a noncontinuous manner, as may be the case for solar power, then the power source data can indicate the noncontinuous manner in which power is supplied by the power source.

Sensor data may include sensor data collected using one or more sensors (e.g., voltage sensor, a current sensor, a temperature sensor, an inertial sensor) of the power tool battery charger, battery pack, and/or power tool. For example, the sensor data may include voltage sensor data indicating a measured voltage associated with the power tool battery charger, battery pack, and/or power tool. For example, such a measured voltage may include a voltage measured across positive and negative power terminals of a power tool battery charger, battery pack, and/or power tool. Likewise, the sensor data may include current sensor data indicating a measured current associated with the power tool battery charger, battery pack, and/or power tool. For example, such a measured current may include a charging current provided from a power tool battery charger and/or received by a battery pack (e.g., at power terminals of the power tool battery charger or battery pack). Additionally, such a measured current may include a discharge current provided from a battery pack and/or received by a power tool (e.g., at power terminals of the battery pack or power tool). Additionally or alternatively, the sensor data may include temperature sensor data that indicate an internal and/or operating temperature of the power tool battery charger, battery pack, and/or power tool. In some embodiments, the sensor data can include inertial sensor data, such as accelerometer data, gyroscope data, and/or magnetometer data. These inertial sensor data can indicate a motion of the power tool battery charger, battery pack, and/or power tool, and can be processed by an electronic controller to determine a force, angular rate, and/or orientation of the power tool battery charger, battery pack, and/or power tool.

Environmental data may include data indicating a characteristic or aspect of the environment in which the power tool battery charger, battery pack, and/or power tool is located. For example, environmental data can include data associated with the weather, a temperature (e.g., external temperature) of the surrounding environment, the humidity of the surrounding environment, and the like.

Operator data may include data indicating an operator and/or owner of a power tool battery charger, a battery pack, a power tool, and the like. For example, operator data may include an operator identifier (ID), an owner ID, or both.

Location data may include data indicating a location of a power tool battery charger, a battery pack, a power tool, and the like. In some embodiments, the location data may indicate a physical location of the power tool battery charger, the battery pack, and/or power tool. For example, the physical location may be represented using geospatial coordinates, such as those determined via GNSS or the like. As another example, the physical location may be represented as a jobsite location (e.g., an address, an identification of a jobsite location) and may include a location within a jobsite (e.g., a particular floor in a skyscraper or other building under construction). In some other embodiments, the location data may indicate a location of the power tool pack adapter, power tool battery charger, battery pack, and/or power tool for inventory management and tracking. Additionally or alternatively, location data may include a unique identifier, such as a serial number, that is picked up by a reader (e.g., an optical receiver device) that then associates the reader's location (e.g., a cell phone GPS fix) with the location of the power tool device.

FIG. 1 illustrates an example power tool communication system 100 in accordance with some embodiments described in the present disclosure. The power tool communication system 100 includes, among other things, a plurality of power tool devices 102*a*-102*f*, an external device 104, a server 106, and a network 108.

The power tool devices 102*a*-102*f* include power tools and devices used in relation to the operation of power tools. For example, the power tool devices 102*a*-102*f* can include a power tool battery charger 102*a*, a battery pack 102*b*, power tools 102*c*-102*d*, a work light 102*e*, a power tool pack adapter 102*f*, as well as other devices used in conjunction with the power tool battery chargers, battery packs, and/or power tools. Each power tool 102*c*-102*d* may be the same tool or may be different tools. Accordingly, each power tool 102*c*-102*d* is configured to perform one or more specific tasks (e.g., drilling, cutting, fastening, pressing, lubricant application, sanding, heating, grinding, bending, forming, impacting, polishing, etc.). The power tool devices 102 illustrated in the power tool communication system 100 are representative examples. The power tool communication system 100 may include more or fewer power tool devices 102 and various combinations of power tool devices 102. In addition to power tools, power tool battery chargers, battery packs, and work lights, the power tool devices 102 can also include other related jobsite powered devices, such as powered coolers, lights, fans, robotics for cleaning, dust mitigation systems, safety hazard systems (e.g., alert lights, warning signs, etc.), blowers, vacuums, electronics (including computers, tablets, phones, etc., intended for the jobsite), powered hubs, gateway devices, smart mats, security cameras, charging strips, extension cords, spider boxes, radios, etc.

As described below in more detail, the power tool devices 102 in the power tool communication system 100 can be controlled using their existing electronic circuitry and/or hardware to generate sounds that can be used to encode data as acoustic signals. In general, power tool devices include transistors, such as field-effect transistors ("FETs"), in their electronics. In some instances, the FETs may be metal-oxide semiconductor FETs ("MOSFETs"). Additionally or alternatively, power tool devices can include other electronic components, such as semiconductor switched devices, that may also generate switching frequencies. Semiconductor switched devices can include bipolar junction transfers ("BJTs"), an insulated-gate bipolar transistors ("IGBTs"), relays, or the like. These and other electronic components of a power tool device 102 can be controlled in such that a manner that a unique, characteristic, or otherwise distinguishable acoustic signature can be generated. This unique acoustic signature can be recorded by an external device 104 and used to identify the power tool device 102 that generated the acoustic signature. Identifying the power tool device 102 may include identifying the specific power tool device 102 that generated the acoustic signature, or may include identifying the type of power tool device 102 (e.g., a power tool versus a battery pack, a drill versus an impact driver) that generated the acoustic signature. Data can also be encoded in this acoustic signature and the resulting sounds detected by an external device 104 or another power tool device to provide for acoustic data transmission.

Power tools, as an example, can emulate a less than full output by using the technique of pulse width modulation. The power tool can rapidly turn on and off and the portion of on-time (i.e., the duty cycle) controls the effective output of the power tool. The frequency (the inverse of the period) at which a power tool completes its pulse width modulation is known as the switching rate. Common switching rates for power tools can be on the order of 7-20 kHz; although, lower and higher rates are possible.

The switching rate creates an audible tone, especially at the characteristic switching rate frequency. While the switching rate can be selected at a frequency that is above the human hearing threshold, the auditory presence exists and can be detected up from a microphone or other acoustic sensor.

Because 100% PWM avoids switching losses, it can be common to design power tools to preferably run at 100% PWM. However, it is also common for power tools to ramp up to 100% PWM, so as to not damage components during in-rush. As such, nearly all power tools exhibit at least some period during operation for which there exists a less than 100% duty cycle that creates an auditory signal associated with the switching rate.

Figure 2A:
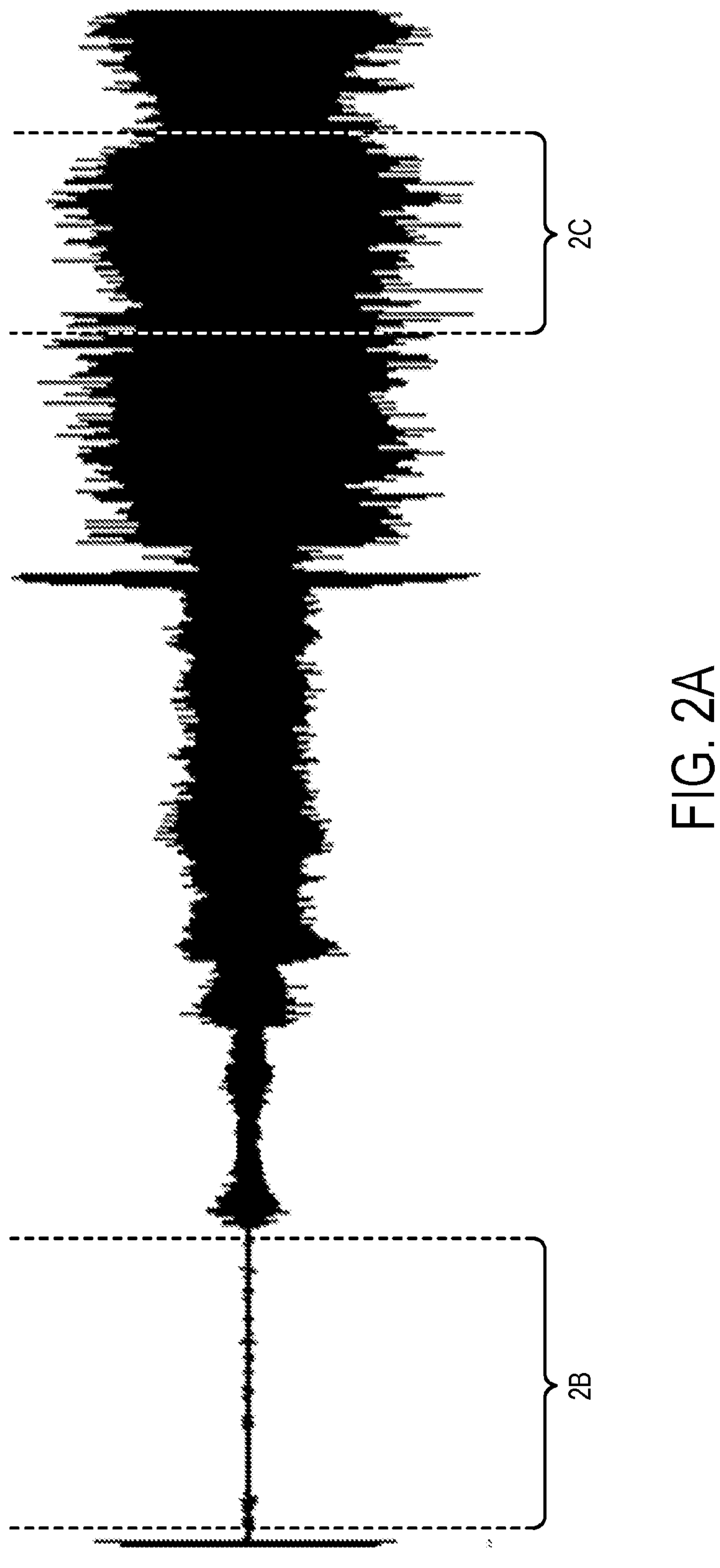
FIGS. 2A-2C illustrate an example acoustic output from operating a power tool (FIG. 2A), including auditory spectra for an initial duty cycle (FIG. 2B) and full duty cycle (FIG. 2C).
Figure 2B:
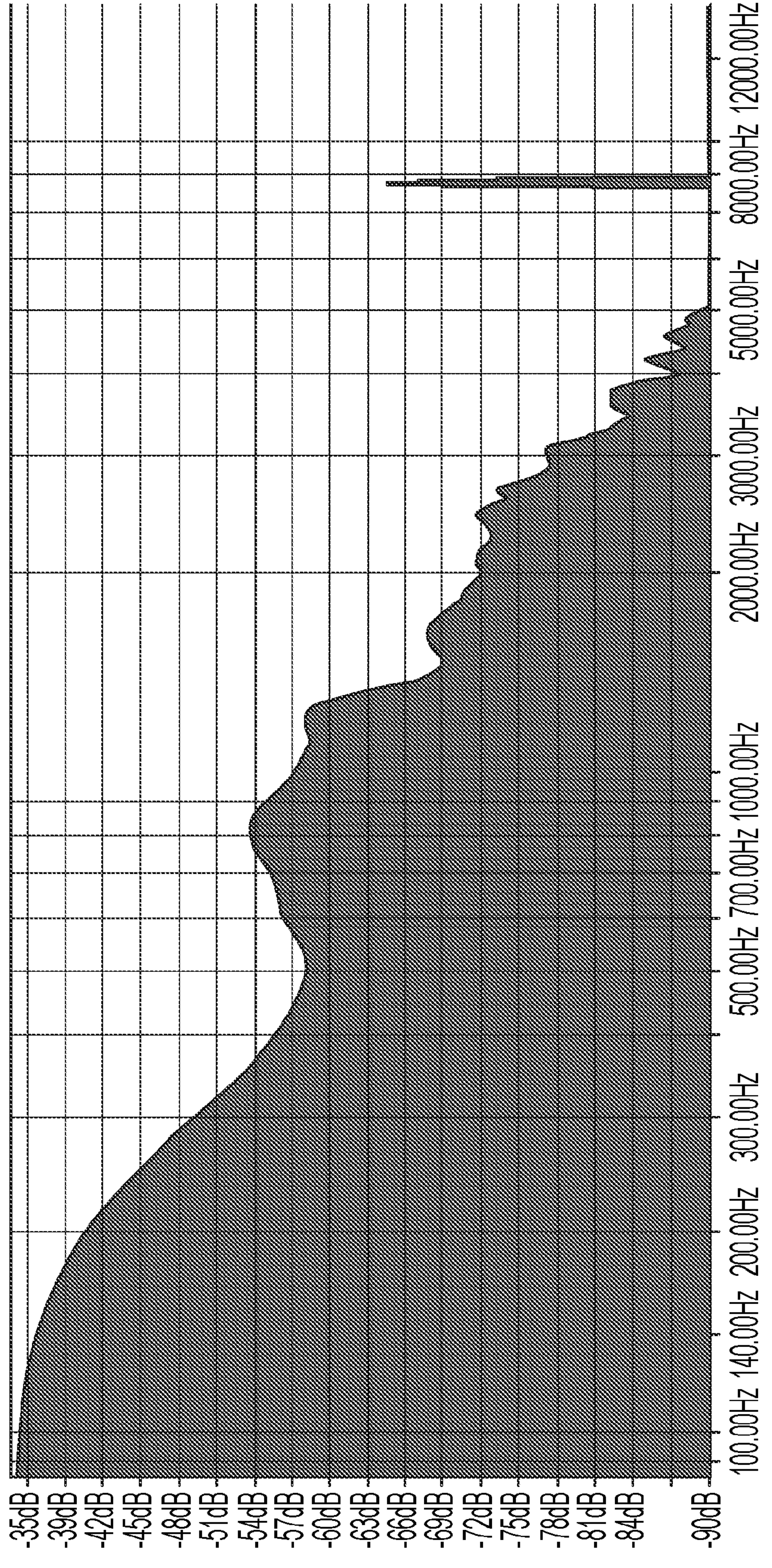
Figure 2C:
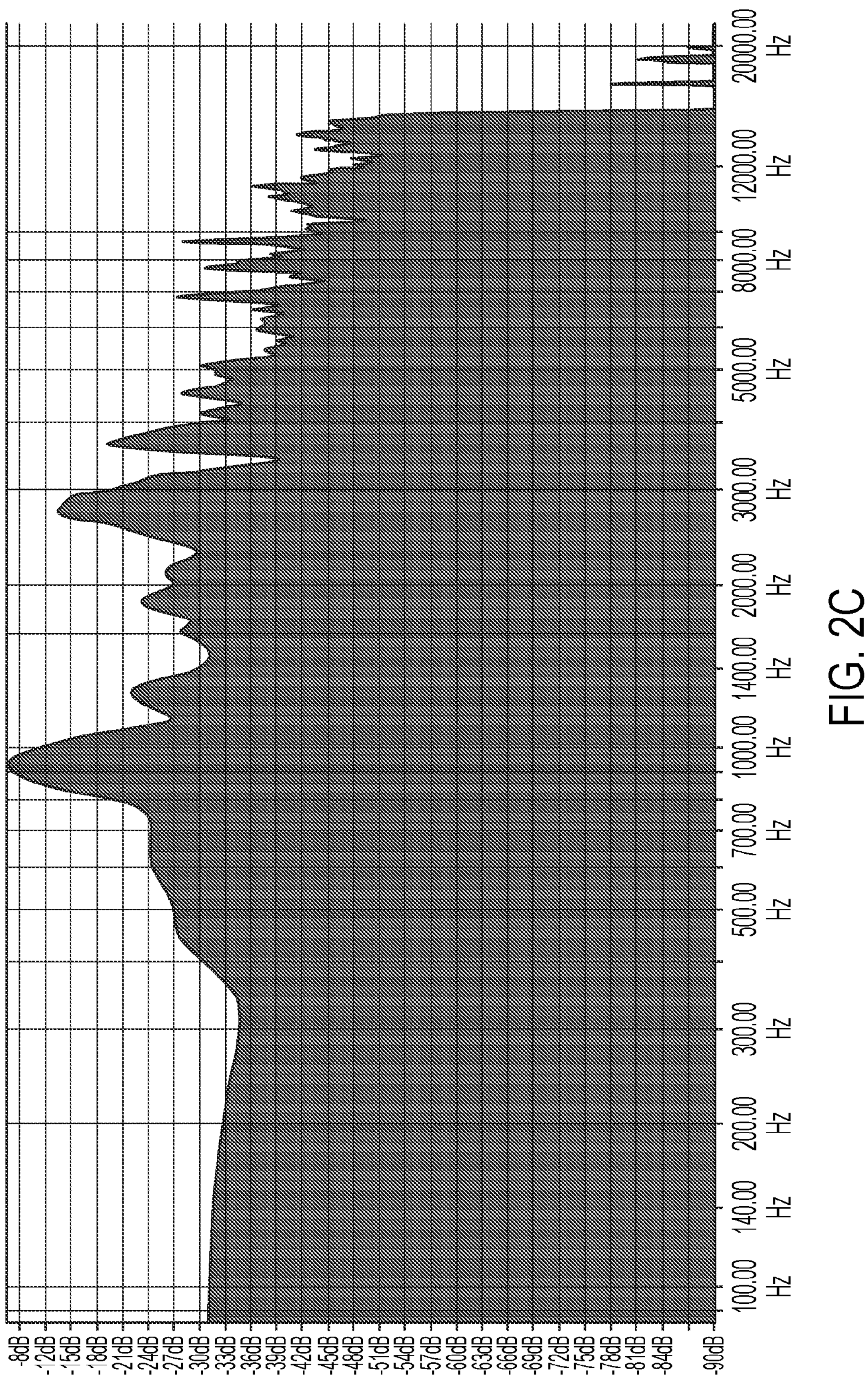

FIG. 2A shows an example acoustic signature of the sound of a drill being run at a very low duty cycle (e.g., less than 10%) and increasing to approximately slightly less than 100%. The initial duty cycle (i.e., less than 10% duty cycle) has the auditory spectrum shown in FIG. 2B, where a large spike can be observed at the switching frequency. To the human ear, this auditory spike may sound like a high pitch chirp, buzz, or squeal. The auditory spectrum for the nearly, but not completely, full pulse width modulation duty cycle range is shown in FIG. 2C. While less distinguishable amongst all of the other noises generated by the power tool (e.g., gears, bearings, the motor, etc.), the switching frequency is still identifiable. As noted above, other power tool devices can also generate acoustic signatures based on their switching frequency. For example, a power tool battery charger has a transistor circuit that can generate an acoustic signature as a particular hum or buzz caused by the switching frequency.

Referring again to FIG. 1, each power tool device 102 can collect usage data or other power tool device data, such as maintenance data, feedback data, power source data, environmental data, operator data, location data, or other data. These collected or stored data can be transmitted as acoustic signal data to the external device 104, as described below in more detail. This mode of data transmission is cost effective because it can make use of existing electronic circuitry (e.g., FETs) that are already on the power tool device 102 and which have a primary or alternative function. Moreover, this mode of data transmission allows for power tool devices that are otherwise not wirelessly connected (e.g., non-IoT enabled power tool devices) to share data and perform functions such as tool identification, debugging and/or maintenance checking, and allowing location updates in a crib.

More generally, a power tool device 102 can transmit data by the pattern of a digital on and off activation at one or more switching frequencies, or by variations in the pitch, signal, duration, activation pattern, profile, etc. A secondary device (e.g., external device 104) then receives and interprets the transmitted data.

As described above, the power tool device 102 can utilize its switching frequency to generate an acoustic signature that can be used to transmit data (e.g., via generating sounds that can encode data as an acoustic signal) or otherwise identify the power tool device 102. For power tools, the switching frequency is best identifiable when the power tool has a nonzero, but extremely low duty cycle. It happens to be the case that for many power tools, the internal resistance (e.g., stiction, grease, clutch, etc.) at the lowest of duty cycles is enough to prevent the power tool from operating at all. This means that a power tool could use its switching frequency at the lowest of duty cycles to communicate without causing a power tool output to move. In some embodiments the direction of commutation can be alternated so that a motor can be kept relatively in the same position while the transmission of data can be employed. In some embodiments, the transmissions can have noticeable gaps or be intermittent so that friction and other factors can have negligible effect on the power tool device 102.

In some embodiments, the power tool device 102 can be controlled using a single switching frequency. Alternatively, two or more switching frequencies can be used. The switching frequencies can be selected as discrete switching frequency values, or can be selected from a continuous range of frequencies. As described above, data and other information can be transmitted via the switching frequency, or switching frequencies, of the power tool device 102. A power tool device 102 can be configured to choose its switching frequency within a small range (e.g., 6-8 kHz) so as to be sufficiently unique to other power tool devices while avoiding changing general performance of the power tool device 102. A power tool device 102 might also choose one or more switching frequencies to employ, where the selected frequency, or frequencies, are more distinguishable from environmental noise or sounds (e.g., the switching frequency or frequencies can be selected to be distinct from the frequency from gearing of a particular power tool based on known RPM or a frequency emitted by other tools).

In some instances, the power tool device 102 can have a first switching frequency for its typical operation (e.g., for performance reasons), and can move to a second switching frequency for data transmission. For example, when ramping a power tool up at start-up, or at very low trigger pulls, the power tool can in some instances employ a secondary switching frequency for data communication and can then switch to a default switching frequency once going faster. Additionally or alternatively, the power tool device 102 can be controlled to transition among different switching frequencies (e.g., ramped, stepped, discrete jumps, etc.) and the transitions can be selected or otherwise controlled to communicate data or other information. In still other embodiments, the power tool device 102 can transmit information in the amplitude of its signal, such as by varying and/or selecting the amplitude (and not just by changing the switching frequency).

Additionally or alternatively, the power tool device 102 can communicate data or other information via its duty cycle, such as by varying and/or selecting the duty cycle. For example, the duty cycle of the power tool device 102 can create secondary frequencies, which can further be used for data transmission and/or identification. In some embodiments, the power tool device 102 can be limited to specific duty cycles (e.g., multiples of 2%, multiples of 3%, multiples of 5%, etc.) to further encode data for transmission.

Additionally or alternatively, the power tool device 102 and/or external device 104 may compensate for factors that may cause a variation in the switching frequency. For example, oscillators are known to change their frequencies with temperature. Some power tool devices 102 may act to at least partially correct for such outside factors. The external device 104 may also compensate for such factors, such as based on external weather data or other environmental data. In some instances, the environmental data can be recorded by the power too device 102 itself (e.g., via one or more sensors). Additionally or alternatively, the environmental data can be recorded by the external device 104 or received from the server 106, another power tool device 102, or the like.

During operation, the power tool device 102 can be controlled to alternate between two or more different switching frequencies, for example. By changing the switching frequency during operation, different types of information can be encoded and transmitted. As a non-limiting example, the switching frequency can be changed between two or more different switching frequency values in order to encode data using a particular code, which in some instances may be a binary encoding. For instance, a power tool device 102 can employ the binary on and off of the power tool device 102 to more directly encode information. The associated on and off times of the electronics may be picked up and read. In other words, the period for the duty cycle could be in constant flux in some instances.

One advantage of implementing utilizing the switching frequency-based data transmission during power tool use is that the back-emf of the power tool motor can limit the high currents that might otherwise (if excessive) cause damage to the power tool. As such, the switching frequency-based data transmission technique can be used during power tool operation, especially for instances where the power tool may not otherwise be making as much noise.

In some embodiments, a power tool device 102 can employ this low PWM switching frequency technique directly after running a normal operation. The sound can be almost imperceivable for human ears, which during operation of a power tool are likely to have adjusted to a level of the power tool during operation.

As one non-limiting example, a unique switching frequency, or a specified range of switching frequencies, can be assigned to an associated group of power tool devices 102. For instance, an associated group of power tool devices may include all power tool devices of the same type (e.g., all drills, all power tool battery chargers) in an inventory, all power tool devices of the same type and model (e.g., all drills of a given model) in an inventory, all power tool devices owned by a given user, all power tool devices in an inventory that are in need of repair, all power tool devices in an inventory that have been used recently, and so on.

In some embodiments, the power tool device 102 can be operated as a repeater (e.g., like in a mesh network) to help augment or extend the transmission of data. For example, a power tool device 102 can receive data (e.g., via a wireless communication device, or otherwise) and can retransmit the data by controlling the operation of the power tool device 102 according to the switching frequency, or switching frequencies, in order to generate an acoustic signal carrying the retransmitted data. Additionally or alternatively, multiple power tool devices 102 can be electronically connected (e.g., a battery pack connected to a power tool). One power tool device 102 may transmit data and/or identifying information to another power tool device 102 (e.g., a battery pack transmitting data and/or identifying information to a connected power tool). Other linking power tool device networks (including via wireless communication protocols such as Bluetooth®, mesh networks, etc.) can help expand one power tool device 102 to represent or communicate on behalf of other power tool devices 102.

In some embodiments, another power tool device 102 can receive data transmitted as an acoustic signal and can convert the acoustic signal into a different signal type (e.g., a wireless signal) that may be retransmitted.

The power tool device 102 can utilize the acoustic data transmission techniques described in the present disclosure according to a schedule, or at other specific times. For instance, acoustic data transmission can be initiated only during certain times of the day (e.g., at night), only after a period of unuse (e.g., so as to not disturb users), or the like.

In some other embodiments, a power tool device 102 can be operated to generate an acoustic signal not based on the switching frequency. For example, while transmitting data using a switching frequency in an ultra-low duty cycle solves the problem of having a power tool rotate, an alternative approach is to have a power tool quickly alternate between a forwards and reverse operation. This alternating motion can create a reverberating note, which can be distinguishable and used similar to the switching frequency to encode acoustic signal data. For power tools such as impacts where the output is at least in part disconnected from the motor, such a reverberating sounds can be effective at generating louder signals without significant movement of the tool.

Some power tools or other power tool devices may also be equipped with a buzzer (e.g., a powered torque wrench) or a speaker. These auditory electronics, may also be used to generate acoustic signals to communicate information or other data to an external device 104, or the like.

In some embodiments, a frequency or other signal characteristic can be embedded into the operation of the electronic components of the power tool device 102. For instance, a frequency can be embedded into the operating motor coils of a power tool in order to produce a customizable or otherwise configurable acoustic signature and/or sound emission. Advantageously, this acoustic signature could be generated even without the motor spinning. In this way, the embedded frequency can be similar to putting a carrier wave onto the motor coil at a center frequency. Similarly, amplitude modulation can be implemented in addition, or alternatively, to frequency modulation. For instance, a varying amplitude waveform at a fixed frequency can be put onto a single motor coil winding.

In addition to sound, power tool devices 102 also emit electromagnetic ("EM") radiation. A power tool device 102 can also be configured to emit electromagnetic signal data that can be detected or otherwise received by the external device 104. EM radiation has the advantage of being able to reach far higher frequencies, improving bandwidth and often being out of range of associated sounds that might be audible to the human hear. In these embodiments, EM radiation of specific frequency or other characteristics can be used to help transmit data in association with a power tool device 102. Advantageously, this EM signal transmission can be implemented using electronics already present in a power tool device 102 (i.e., not by adding a Bluetooth® chip or other wireless communication device). The EM emission can be in the frequency range of an FM radio, an AM radio, or any other suitable frequency. In some embodiments, the EM signal-based technique can be used to transmit information picked up by a secondary system, such as a walkie-talkie, radio, alert system, etc. The message could be played back when converted to be recognizable words and recognizable sounds (alarms, beeps, notification sounds, etc.).

As a non-limiting example, the coils of a power tool or other power tool device can also act as a receiver for EM waves. While the coils may not be optimized for receiving information, they are still capable of some communication (e.g., by picking up on given switching frequencies that identify tools) that may be useful for power tool device-to-power tool device information transmission and for creating mesh networks that could be used to help identify what tools may be located in a given area.

In the illustrated embodiment, the power tool device(s) 102 communicate with the external device 104 via acoustic data transmission as described above. The external device 104 is in acoustic communication with the power tool devices 102 and is configured to receive or otherwise detect acoustic signal data (e.g., sounds, acoustic signatures) generated by electronics (e.g., FETs, MOSFETs) of the power tool devices 102 being controlled to operate at one or more switching frequencies in order to generate an acoustic signature.

In general, the external device 104 includes a microphone or other acoustic detector that is configured to receive or otherwise detect the acoustic signal data generated by the power tool device 102. In this way, the power tool device 102 is capable of wirelessly communicating with the external device 104 using acoustic data transmission.

The external device 104 may include, for example, a smartphone, a tablet computer, a cellular phone, a laptop computer, a smart watch, a headset, a heads-up display, virtual reality ("VR") goggles, augmented reality ("AR") goggles, a security camera, a web camera, a standalone microphone or microphone array, other electronic devices with a microphone input, and the like. In some embodiments, the external device 104 may include a gateway or hub device that goes on a jobsite and has a microphone input. The acoustic signal generated by a power tool device 102 can be detected by other power tool devices in addition, or alternatively, to the external device 104. For example, other power tool devices having a microphone or other acoustic detector, including power tool battery chargers, battery packs, power tools, power tool pack adapters, inverters, etc., could be used to detect acoustic signals. While a standard microphone can pick up many frequencies, the external device 104 can be equipped with a microphone configured to detect acoustic signals over a specified range of frequencies consistent with the set of frequencies to be used by the acoustic data transmission. It is an advantage that, by having a dedicated set of frequencies for acoustic data transmission, the circuitry, resonators, or digital filtering can be made more efficient to detect acoustic signals within the specified range of frequencies.

The power tool device 102 communicates with the external device 104, for example, to transmit at least a portion of the usage information or other power tool device data stored on or collected by the power tool device 102. In some embodiments, the external device 104 may include a long-range transceiver to communicate with the server 106 and/or a short-range transceiver to communicate with other external devices or power tool devices via, for example, a short-range communication protocol such as Bluetooth® or Wi-Fi®. In some embodiments, the external device 104 bridges the communication between the power tool device 102 and the server 106. For example, the power tool device 102 may transmit data to the external device 104, and the external device 104 may forward the data from the power tool device 102 to the server 106 over the network 108.

To perform its various functions, the external device 104 may include a device electronic control assembly having a device electronic processor, a device memory, and the aforementioned transceiver (also referred to as a device transceiver). For example, the device electronic processor may be coupled to the acoustic detector (e.g., microphone) and/or other detectors configured to receive the other noted types of wireless communications that the power tool devices 102 may transmit (e.g., EM communications). The device electronic processor may be configured to receive the communications transmitted by the power tool device 102 via the acoustic or other detector(s), process the communications (e.g., decode), store the communications in the device memory, transmit the communications (e.g., via the device transceiver). The device electronic processor and device memory may collectively form a device electronic controller that is configured to perform certain methods described herein (e.g., the process 500 of FIG. 5; and/or aspects of the process 600 of FIG. 6 and/or process 700 of FIG. 7 performed by the external device).

The server 106 includes a server electronic control assembly having a server electronic processor, a server memory, and a transceiver. The transceiver allows the server 106 to communicate with the external device 104. The server electronic processor receives usage data and/or other power tool device data from the power tool device 102 (e.g., via the external device 104), and stores the received usage data and/or other power tool device data in the server memory. The server 106 may maintain a database (e.g., on the server memory) for containing power tool device data, trained machine learning controls (e.g., trained machine learning model and/or algorithms), artificial intelligence controls (e.g., rules and/or other control logic implemented in an artificial intelligence model and/or algorithm), and the like.

Although illustrated as a single device, the server 106 may be a distributed device in which the server electronic processor and server memory are distributed among two or more units that are communicatively coupled (e.g., via the network 108).

The network 108 may be a long-range wireless network such as the Internet, a local area network ("LAN"), a wide area network ("WAN"), or a combination thereof. In other embodiments, the network 108 may be a short-range wireless communication network, and in yet other embodiments, the network 108 may be a wired network using, for example, USB cables. Additionally or alternatively, the network 108 may include a combination of long-range, short-range, and/or wired connections. In some embodiments, the network 108 may include both wired and wireless devices and connections.

In some embodiments, the power tool device 102, the external device 104, and/or the server 106 may include a machine learning controller and/or an artificial intelligence controller. In these instances, the machine learning controller is coupled to the electronic controller of the power tool device 102, external device 104, and/or server 106, and in some embodiments may be selectively coupled such that an activation switch (e.g., mechanical switch, electronic switch, UI element) can selectively switch between an activated state and a deactivated state. When the activation switch is in the activated state, the electronic controller of the power tool device 102, external device 104, and/or server 106 is in communication with the machine learning controller and receives decision outputs from the machine learning controller. When the activation switch is in the deactivated state, the electronic controller of the power tool device 102, external device 104, and/or server 106 is not in communication with the machine learning controller. In other words, the activation switch selectively enables and disables the machine learning controller.

The machine learning controller implements a machine learning program, algorithm or model. In some implementations, the machine learning controller is configured to construct a model (e.g., building one or more algorithms) based on example inputs, which may be done using supervised learning, unsupervised learning, reinforcement learning, ensemble learning, active learning, transfer learning, or other suitable learning techniques for machine learning programs, algorithms, or models. Additionally or alternatively, the machine learning controller is configured to modify a machine learning program, algorithm, or model; to active and/or deactivate a machine learning program, algorithm, or model; to switch between different machine learning programs, algorithms, or models; and/or to change output thresholds for a machine learning program, algorithms, or model.

The machine learning controller can include a trained machine learning controller that utilizes previously collected data to analyze and classify new data from the power tool device 102. The machine learning controller can identify conditions, applications, and states of the power tool device 102.

The machine learning controller may be a static machine learning controller, a self-updating machine learning controller, an adjustable machine learning controller, or the like. In some embodiments, the power tool device 102, external device 104, and/or server 106 may include more than one machine learning controller, and each machine learning controller may be of a different type.

In some embodiments, the power tool device 102, external device 104, and/or server 106 may implement an artificial intelligence controller instead of, or in addition to, the machine learning controller. The artificial intelligence controller implements one or more AI programs, algorithms, or models. In some embodiments, the AI controller is configured to implement the one or more AI programs, algorithms, or models such as an expert system, a rules engine, a symbolic logic, one or more knowledge graphs, and so on. In some embodiments, the AI controller is integrated into and implemented by the electronic controller of the power tool device 102, external device 104, and/or server 106 (e.g., the electronic controller may be referred to as an AI controller). In some embodiments, the AI controller is a separate controller from the electronic controller of the power tool device 102, external device 104, and/or server 106 and includes an electronic processor and memory, similar to the machine learning controller.

Figure 3:
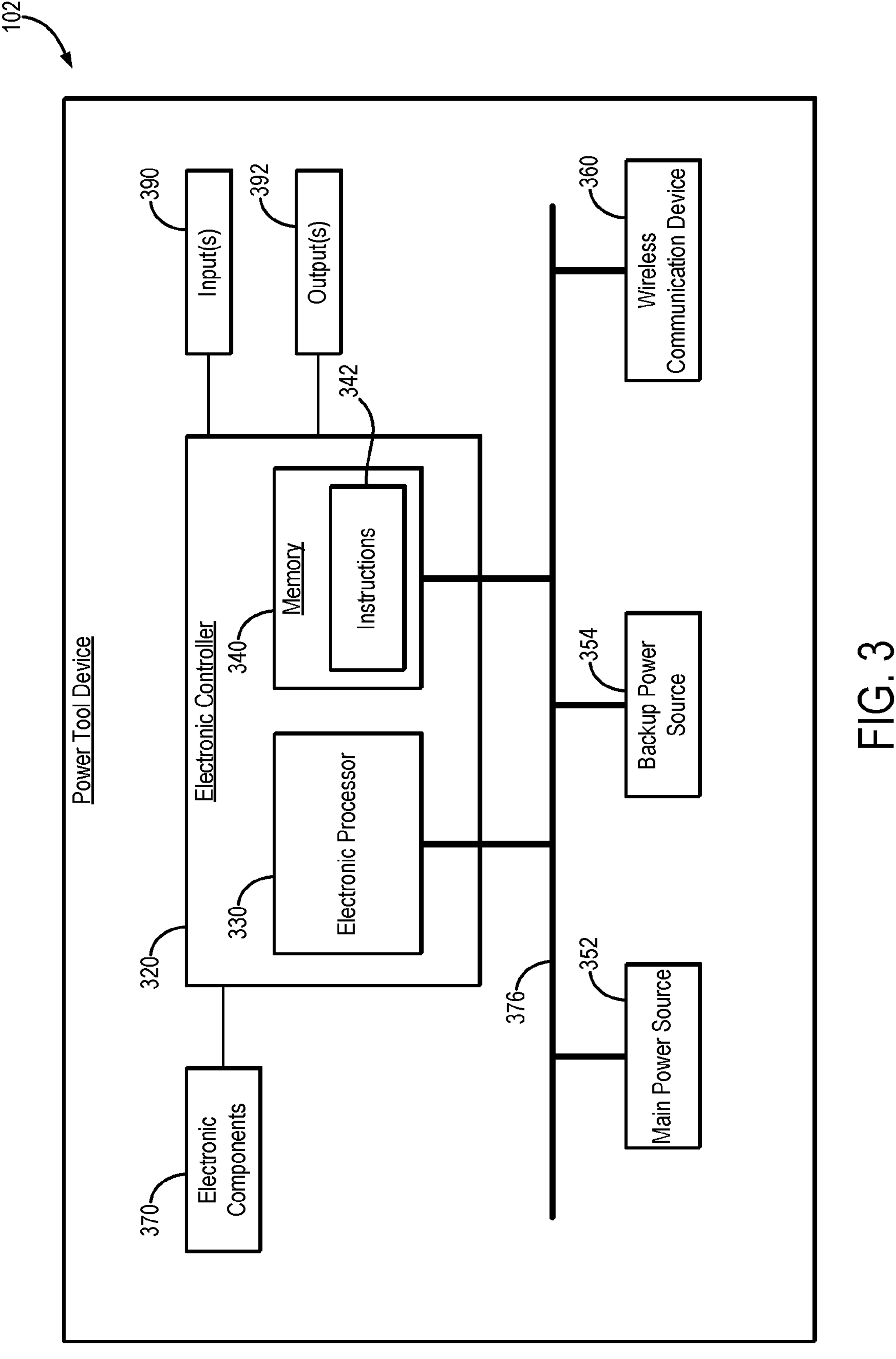
FIG. 3 is a block diagram of an example power tool device that can be implemented in the power tool communication system of FIG. 1.

FIG. 3 shows a block diagram of an example power tool device 102, which may be one of the power tool devices **102*a*-102*f* shown in FIG. 1 or another suitable power tool device. The power tool device 102 includes an electronic controller 320, a main power source 352 (e.g., a battery pack, a portable power supply, and/or a wall outlet), etc. In the illustrated embodiment, the power tool device 102 also includes a backup power source 354 (e.g., a coil cell battery) and a wireless communication device 360. In other embodiments, the power tool device 102 may not include a backup power source 354. Similarly, in some embodiments, the power tool device 102 may not include a wireless communication device 360**.

The electronic controller 320 can include an electronic processor 330 and memory 340. The electronic processor 330 and the memory 340 can communicate over one or more control buses, data buses, etc., which can include a device communication bus 376. The control and/or data buses are shown generally in FIG. 3 for illustrative purposes. The use of one or more control and/or data buses for the interconnection between and communication among the various modules, circuits, and components would be known to a person skilled in the art.

The electronic processor 330 can be configured to communicate with the memory 340 to store data and retrieve stored data. The electronic processor 330 can be configured to receive instructions 342 and data from the memory 340 and execute, among other things, the instructions 342. In particular, the electronic processor 330 executes instructions 342 stored in the memory 340. Thus, the electronic controller 320 coupled with the electronic processor 330 and the memory 340 can be configured to perform the methods described herein (e.g., one or more aspects of the process 400 of FIG. 4; the process 500 of FIG. 5; the process 600 of FIG. 6; and/or the process 700 of FIG. 7).

The memory 340 can include read-only memory ("ROM"), random access memory ("RAM"), other non-transitory computer-readable media, or a combination thereof. The memory 340 can include instructions 342 for the electronic processor 330 to execute. The instructions 342 can include software executable by the electronic processor 330 to enable the electronic controller 320 to, among other things, receive data and/or commands, transmit data, control operation of a connected power tool device, and the like. The software can include, for example, firmware, one or more applications, program data, filters, rules, one or more program modules, and other executable instructions.

The electronic processor 330 is configured to retrieve from memory 340 and execute, among other things, instructions related to the control processes and methods described herein. The electronic processor 330 is also configured to store data on the memory 340 including usage data (e.g., usage data of the power tool device 102 or another power tool device), maintenance data (e.g., maintenance data of the power tool device 102 or another power tool device), feedback data, power source data, sensor data (e.g., sensor data of the power tool device 102 or another power tool device), environmental data, operator data, location data, and the like.

Additionally, the electronic processor 330 can also be configured to store other data on the memory 340 including information identifying the type of power tool device 102, a unique identifier for the particular power tool device 102, user characteristics (e.g., identity, trade type, skill level), and other information relevant to operating or maintaining the power tool device 102 (e.g., received from an external source, such as the external device 104 or pre-programed at the time of manufacture). For example, other data that may be collected by, or otherwise stored on, the memory 340 can include tool name data (e.g., a custom tool name, a standard tool name, a tool model, a tool type), an owner name, key settings, key diagnostics, key analytics (e.g., number of users, whether the power tool device has been subject to heavy or light use), warranty information, error codes, security messages, unique tool identifiers (e.g., a serial number or ID), histograms or other statistics of a parameter (e.g., maximum currents, maximum temperatures, durations of use), sequential statistics of one or more tool runs (e.g., duration, power, and time of a tool run), classifications or regressions associated with one or more tool runs (e.g., classification of what application a tool was used for, regression of output torque, etc.), raw or processed data from one or more tool runs, an encrypted message containing any of the aforementioned data types, a qualitative representation of an aspect of a power tool (e.g., frequent or rare use), a warning (e.g., an indication that the tool has been dropped), a request for service, the time since last use, a state of charge (e.g., for battery packs), an indication that the power tool device is in need for repair, a verification that the power tool device has been updated to the same firmware (e.g., same blinking pattern), and/or a security key (e.g., which may be advantageous if combined with another encryption key transferred via a different means (e.g., Bluetooth®)).

The memory 340 can also store data related to communications between the power tool device 102 and the external device 104. The electronic processor 330 controls acoustic communications between the power tool device 102 and the external device 104. For example, the electronic processor 330 buffers incoming and/or outgoing data, communicates with the electronic controller 320 of the power tool device 102, and determines the communication protocol and/or settings to use in acoustic data transmission.

For example, the electronic processor 330 can receive instructions 342 from the memory 340 that include settings or configurations for how the power tool device 102 should modify its switching frequencies, means of communication, times at or during which to communicate, and so on. These acoustic data transmission settings can be received and/or updated wirelessly through an app, customized in firmware (e.g., programmed for particular users at manufacture or with firmware updates), customized via inputs directly on the power tool device (e.g., via a button, switch, set of user interface actions, controls on a screen, etc.).

In some embodiments, the main power source 352 can be an AC power source or a DC power source, which can be in electrical communication with one or more power outlets (e.g., AC or DC outlets). For instance, the main power source 352 can be an AC power source, for example, a conventional wall outlet, or the main power source 352 can be a DC power source, for example, a photovoltaic cell (e.g., a solar panel). Additionally or alternatively, the main power source 352 can be a battery pack (e.g., the power tool battery pack 102*b* of FIG. 1).

The power tool device 102 receives electrical power from the main power source 352 and optionally from a backup power source 354 based on which power supply is available. When the main power source 352 is connected to the power tool device 102 and the main power source 352 holds sufficient power, the main power source 352 provides electrical power to the power tool device 102. If, on the other hand, the main power source 352 is not connected to the power tool device 102 (e.g., when a battery pack is not connected to a power tool, when a power tool battery charger is unplugged from a wall outlet) or when the main power source 352 otherwise does not hold sufficient power (e.g., when the battery cells of a battery pack are depleted), the backup power source 354 provides power to the electronic components 370 for generating acoustic signals.

The backup power source 354, however, has limited supply of power and could be quickly drained if used to power significant electronic data exchange between the power tool device 102 and the external device 104. Therefore, in some embodiments, when the backup power source 354 powers the electronic components 370, the power tool device 102 outputs (e.g., broadcasts) only limited information (e.g., identification information) for the power tool device 102, but does not enable further data exchange between the power tool device 102 and the external device 104. In other embodiments, the backup power source 354 has sufficient power to enable full data exchange between the power tool device 102 and the external device 104.

In some embodiments, the backup power source 354 is a coin cell battery and/or a charged capacitor. The coin cell battery is removable from the power tool device 102 and is, therefore, located in an accessible area of the power tool device 102. In many embodiments, the backup power source 354 is accessed and replaced by the user/operator of the power tool device 102. In other embodiments, however, the backup power source 354 is located in a hard-to-access portion of the power tool device 102 and is replaced by a professional serviceperson. For instance, rather than being located in a dedicated battery recess accessible via a sliding or removable door on the power tool device housing, the backup power source 354 may require opening the main housing using one or more tools.

In some embodiments, the power tool device 102 may also include a wireless communication device 360. In these embodiments, the wireless communication device 360 is coupled to the electronic controller 320 (e.g., via the device communication bus 376). The wireless communication device 360 may include, for example, a radio transceiver and antenna, a memory, and an electronic processor. In some examples, the wireless communication device 360 can further include a GNSS receiver configured to receive signals from GNSS satellites, land-based transmitters, etc. The radio transceiver and antenna operate together to send and receive wireless messages to and from the external device 104, one or more additional power tool devices, the server 106, and/or the electronic processor of the wireless communication device 360. The memory of the wireless communication device 360 stores instructions to be implemented by the electronic processor and/or may store data related to communications between the power tool device 102 and the external device 104, one or more additional power tool devices, and/or the server 106.

The electronic processor for the wireless communication device 360 controls wireless communications between the power tool device 102 and the external device 104, one or more additional power tool devices, and/or the server 106. For example, the electronic processor of the wireless communication device 360 buffers incoming and/or outgoing data, communicates with the electronic processor 330 and determines the communication protocol and/or settings to use in wireless communications.

In some embodiments, the wireless communication device 360 is a Bluetooth® controller. The Bluetooth® controller communicates with the external device 104, one or more additional power tool devices, and/or the server 106 employing the Bluetooth® protocol. In such embodiments, therefore, the external device 104, one or more additional power tool devices, and/or the server 106 and the power tool device 102 are within a communication range (i.e., in proximity) of each other while they exchange data. In other embodiments, the wireless communication device 360 communicates using other protocols (e.g., Wi-Fi®, cellular protocols, a proprietary protocol, etc.) over a different type of wireless network. For example, the wireless communication device 360 may be configured to communicate via Wi-Fi® through a wide area network such as the Internet or a local area network, or to communicate through a piconet (e.g., using infrared or NFC communications). The communication via the wireless communication device 360 may be encrypted to protect the data exchanged between the power tool device 102 and the external device 104, one or more additional power tool devices, and/or the server 106 from third parties.

The wireless communication device 360, in some embodiments, exports usage data, other power tool device data, and/or other data as described above from the power tool device 102 (e.g., from the electronic processor 330).

In some embodiments, the wireless communication device 360 can be within a separate housing along with the electronic controller 320 or another electronic controller, and that separate housing selectively attaches to the power tool device 102. For example, the separate housing may attach to an outside surface of the power tool device 102 or may be inserted into a receptacle of the power tool device 102. Accordingly, the wireless communication capabilities of the power tool device 102 can reside in part on a selectively attachable communication device, rather than integrated into the power tool device 102. Such selectively attachable communication devices can include electrical terminals that engage with reciprocal electrical terminals of the power tool device 102 to enable communication between the respective devices and enable the power tool device 102 to provide power to the selectively attachable communication device. In other embodiments, the wireless communication device 360 can be integrated into the power tool device 102. In some embodiments, the wireless communication device 360 is not included in the power tool device 102.

The power tool device 102 also includes one or more additional electronic components 370. In general, the power tool device 102 will include one or more transistors, semiconductor switching devices, or the like. The transistors may be FETs, which in some instances may include on or more MOSFETs. The semiconductor switching devices may include BJTs, IGBTs, relays, or the like. For example, when the power tool device 102 is a power tool, it will include transistors, FETs, and/or MOSFETs (e.g., in a bridge formation) for controlling the operation of the power tool motor. As described above, the transistors, FETs, and/or MOSFETs can be operated to generate acoustic signatures at one or more switching frequencies, which can be used to generate sound that encodes data as acoustic signal data.

The electronic components 370 can also include, for example, an audio element (e.g., a speaker, a microphone). As also described above, in some embodiments these additional audio elements can be used to generate and/or detect acoustic signal data.

The electronic components 370 may also include an RFID tag to store a power tool device identification number, an RFID reader to read the power tool device identification number stored on an RFID tag of another power tool device, an NFC tag to store a power tool device identification number, and/or an NFC reader to read the power tool device identification number stored on an NFC tag of another power tool device. Additionally or alternatively, the electronic components 370 can include a clock or an oscillator.

The electronic components 370 may further include one or more switches (e.g., for initiating and ceasing operation of the power tool device), one or more sensors, one or more motors, etc. For example, in a motorized power tool (e.g., drill-driver, saw, etc.), electronic components 370 can include, for example, an inverter bridge, a motor (e.g., brushed or brushless) for driving a tool implement, etc. For a non-motorized power tool (e.g., a work light, a work radio, ruggedized tracking device, etc.), the electronic components 370 can include, for example, one or more of a lighting element (e.g., LEDs for illuminating a work area), an audio element (e.g., a speaker), a power source, etc.

In some embodiments, electronic controller 320 can be configured to control one or more of electronic components 370. For example, in instances where the power tool device 102 is a motorized power tool and the electronic components 370 include a motor and a sensor for sensing actuation of a trigger of a power tool, the electronic controller 320 can be configured to control an inverter bridge (e.g., of FETs and/or MOSFETs) or otherwise control driving of the motor based on sensed actuation of the trigger.

In some embodiments, the electronic controller 320 is also connected to one or more sensors 372, which may include voltage sensors or voltage sensing circuits, current sensors or current sensing circuits, temperature sensors or temperature sensing circuits, inertial sensors or inertial sensing circuits (e.g., accelerometers, gyroscopes, magnetometers), a pressure sensor or pressure sensing circuit (e.g., a barometer), or the like. The temperature sensor(s) may include, for example, a thermistor. The power tool device 102 may also include connections (e.g., wired or wireless connections) for external sensors.

In some embodiments, the power tool battery device 102 can include one or more inputs 390 (e.g., one or more buttons, switches, and the like) that are coupled to the electronic controller 320 and allow a user to select a mode of the power tool device 102. In some embodiments, the input 390 includes a user interface ("UI") element, such as an actuator, a button, a switch, a dial, a spinner wheel, a touch screen, or the like, that enable user interaction with the power tool device 102.

In some embodiments, the power tool device 102 may include one or more outputs 392 that are also coupled to the electronic controller 320. The output(s) 392 can receive control signals from the electronic controller 320 to present data or information to a user in response, or to generate other visual, audio, or other outputs. As one example, the output(s) 392 can generate a visual signal to convey information regarding the operation or state of the power tool device 102 to the user. The output(s) 392 may include, for example, LEDs or a display screen and may generate various signals indicative of, for example, an operational state or mode of the power tool device 102, an abnormal condition or event detected during the operation of the power tool device 102, and the like. For example, the output(s) 392 may indicate the state or status of the power tool device 102, an operating mode of the power tool device 102, and the like.

Figure 4:
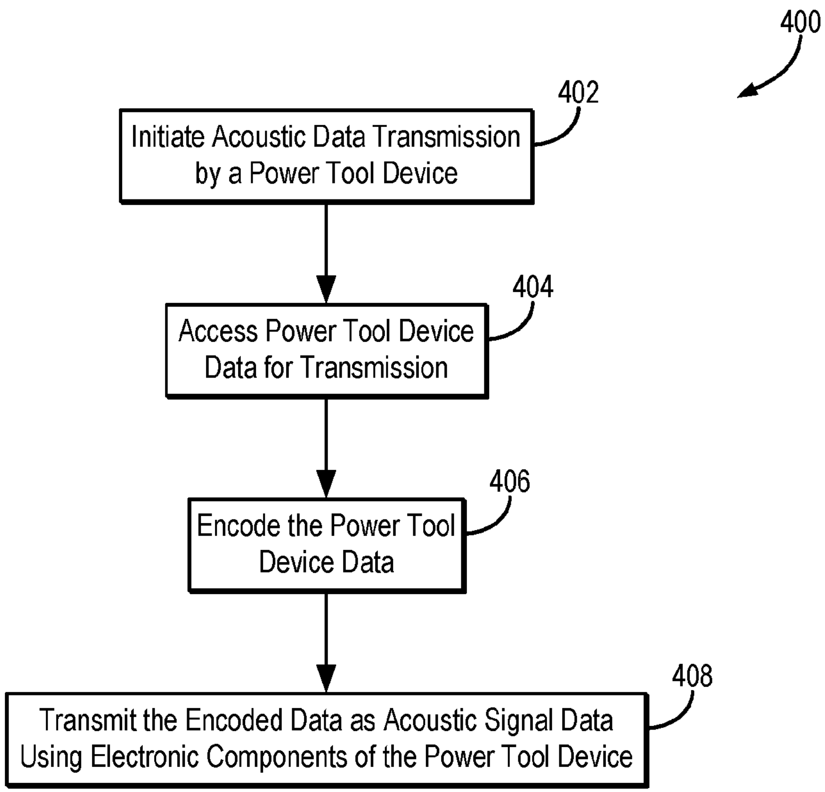
FIG. 4 is a flowchart illustrating a method for transmitting data from a power tool device using acoustic data transmission based on acoustic signals generated by electronic components of the power tool device.

FIG. 4 illustrates a process 400 of transmitting data from a power tool device (e.g., power tool device 102) using acoustic data transmission, such as by controlling electronics (e.g., FETs, MOSFETs) of the power tool device 102 to generate acoustic signals at one or more switching frequencies, or the like.

Acoustic data transmission from the power tool device 102 is first activated or otherwise initiated, as indicated at step 402. The activation of acoustic data transmission can be initiated by a user (e.g., via an input 390 of the power tool device 102, via a graphical user interface on an external device 104). For example, acoustic data transmission can be activated in response to detecting a user activation of an input 390 (e.g., a trigger, button, or other user interface action) having a specialized function to initiate acoustic data transmission. As another example, a power tool or other power tool device 102 could also initiate acoustic data transmission in response to detecting repeated pulses of a trigger, cycling a mode switch, repeated rotation of a clutch ring, a series of user interface actions, a sustained button press, or the like. In still other instances acoustic data transmission can be initiated any time the power tool device 102 is operating (e.g., the power tool device 102 will generate the switching frequency in normal operation, which can be used to transmit acoustic signal data). As described below, in some embodiments the transmitted data include identifying information for the power tool device 102 and, therefore, can be generally transmitted as the power tool device 102 is being operated according to its normal use.

In other embodiments, acoustic data transmission can be activated or otherwise initiated according to a schedule (e.g., as determined or based on a clock of the power tool device 102). As another example, acoustic data transmission may be activated at a random periodicity or at fixed intervals. In some implementations, internal clocks of the power tool devices 102 may be sufficiently out-of-synchronization so as to prevent or reduce the likelihood that messages transmitted from different power tool devices 102 interfere with each other. The acoustic data transmission can also be initiated based on time and date information. For example, acoustic data transmission can be scheduled to occur during certain hours of the day (e.g., at night). This may have the advantage of the surrounding environment otherwise being quiet, which can improve the acoustic data transmission. Acoustic data transmission may also be initiated based on a duration of time since a power tool device 102 has last been used.

Additionally or alternatively, acoustic data transmission can be activated based on one or more conditions. For example, the power tool device 102 may initiate acoustic data transmission only when it is at or near a certain location (e.g., stored in a crib or tool chest, etc.). Likewise, one setting for the power tool device can be to disable extra switching frequency emission or set to a minimum default. There could be a geofence for silent areas where acoustic data transmission should not be initiated. For example, the power tool device 102 may be configured to not generate acoustic signals when in a house, but may initiate acoustic data transmission when the power tool device 102 is located in a work truck or on a jobsite.

In step 404, when acoustic data transmission is initiated, the power tool device 102 accesses or otherwise retrieves the relevant data to be transmitted from its memory 340. For example, the electronic processor 330 can retrieve power tool device data or other data stored in the memory 340 of the electronic controller 320 controller 320. In some embodiments, the power tool device 102 can receive data from another connected power tool device. As an example, when the power tool device 102 is a power tool or power tool battery charger having a battery pack that is connected thereto, the electronic processor 330 of the power tool may also access data (e.g., power tool device data) from the connected battery pack. For instance, a battery pack can send an error code to the electronic processor 330. In these instances, the power tool or power tool battery charger can acoustically transmit data from the connected battery pack to the external device 104. This can be useful, for example, when a battery pack may not otherwise have the electronic circuitry or components that are operable to generate acoustic signal data.

The electronic processor 330 then encodes the data (e.g., power tool device data) retrieved or otherwise accessed from the memory 340 of the power tool device 102, as indicated at step 406. The encoded data include control parameters for controlling the electronic components 370 (e.g., FETs, MOSFETs) of the power tool device 102 to generate acoustic signal data (e.g., sounds emitted by modulating the switching frequency, or the like) that indicate an encoded representation of the data retrieved or otherwise accessed from the memory 340 of the power tool device 102. For example, a mapping function or lookup table may iteratively translate segments of the power tool device data (e.g., one byte at a time, two bytes at a time, or another data size at a time) to the encoded data and/or the control parameters of the encoded data. As described below, the encoded data can be generated using various different encoding schemes. For example, the encoded data can be generated using a binary encoding (e.g., by alternating the switching frequency between an "on" state and an "off" state") or using non-binary encoding schemes (e.g., by varying one or more characteristics of the sound emitted by the electronic components 370, such as amplitude, frequency, pitch, duration, etc.).

Additionally or alternatively, modulating the switching frequency can include selecting one or more switching frequencies and/or selecting a range of switching frequencies. Acoustic signal data can be encoded by alternating between different switching frequencies and/or modulating different characteristics of the acoustic emissions at the different switching frequencies. Individual power tool devices 102 (e.g., individual power tools, individual power tool battery chargers, individual battery packs) may be identified by the particular switching frequencies used for acoustic data transmission. For example, a first power tool 102*c* may be configured to transmit acoustic data by operating electronic components 370 at a first switching frequency and a second power tool 102*d* may be configured to transmit acoustic data by operating electronic components 370 at a second switching frequency that is different from the first switching frequency. In this example, the external device 104 can be configured to differentiate acoustic signal data received from the first power tool 102*c* from acoustic signal data received from the second power tool 102*d* based on the first and second switching frequencies.

Additionally or alternatively, individual types of power tool devices 102 may be identified by the particular switching frequency being modulated. For example, the electronic components 370 of impact drivers may emit sounds at one switching frequency (or range of switching frequencies), whereas the electronic components 370 of reciprocating saws may emit sounds at another switching frequency (or range of switching frequencies); or, the electronic components 370 of power tools may emit sounds at a first switching frequency (or range of switching frequencies), whereas the electronic components 370 of power tool battery chargers may emit sounds at a second switching frequency (or range of switching frequencies); or, combinations thereof. In this way, the external device 104 can be configured to differentiate acoustic signal data received from different types of power tool devices 102.

In some embodiments, different ranges of switching frequencies can be selected for different power tool devices 102 or different types of power tool devices 102. For example, a range of switching frequencies may be assigned based on power tool device data (e.g., operator data, location data). Additionally or alternatively, different ranges of switching frequencies may be assigned to different types of power tool devices 102. For example, a first range of switching frequencies (e.g., 5-6 kHz) may be assigned to a first type of power tool device 102 and a second range of switching frequencies (e.g., 7-8 kHz) may be assigned to a second type of power tool device 102. The different types of power tool devices 102 may include different types of power tools, battery packs with different nominal voltages, power tools versus battery packs or power tool battery chargers, and so on.

The encoded data may also be encrypted. Decryption may require a user (or device) to know the ID, a private or public key, or another aspect of the sending device in order to decrypt the message.

The electronic controller 320 controls the electronic components 370 of the power tool device 102 (e.g., FETs, MOSFETs) to transmit the encoded data as acoustic signal data, as indicated at step 408. For example, the electronic controller 320 may control the electronic components 370 based on according to the control parameters of the encoded data, which may result in the transmission of the encoded data as the acoustic signal data. In some embodiments, the power tool device 102 can transmit the acoustic signal data as sound generated by switching electronic components 370 (e.g., FETs, MOSFETs) according to one or more switching frequencies. In some other embodiments, the power tool device 102 can transmit the acoustic signal data by controlling the electronic components 370 (e.g., FETs, MOSFETs) to generate a chirp. Additionally or alternatively, the acoustic signal data can be transmitted by modulating a duty cycle of the power tool device 102 and/or modulating the one or more switching frequencies during a low-duty-cycle period of the power tool device operation. In still other instances, other characteristics of the acoustic signature of sound emitted by the electronic components 370 can be modulated or varied, including pitch, amplitude, duration, switching pattern, and so on.

The acoustic signal data can be transmitted using various different modulation schemes. For example, analog signals can be modulated using amplitude modulation, frequency modulation, phase modulation, or the like. Additionally or alternatively, variations in the pitch, signal, duration, activation pattern, profile, etc., may all be used to transmit further information.

As described above, in some instances, the encoded data are encrypted before being transmitted by the electronic components 370 (e.g., FETs, MOSFETs) of the power tool device 102 as acoustic signal data. In these instances, a security key can used to decrypt the encrypted data. This security key data can be transmitted as acoustic signal data, or may be transmitted by the power tool device 102 using other means of communication (e.g., an out-of-band communication). For example, security key data for decrypting encoded data that have been encrypted can be transmitted from a wireless communication device 360 of a power tool device 102 (e.g., via a Bluetooth®, Wi-Fi®, NFC connection). The security key data can be transmitted to the external device 104, which may then be passed on to the server 106.

In some embodiments, the acoustic signal data may be transmitted multiple times (i.e., the transmitted data packet may be repeated multiple times). For example, the same acoustic signal data packet, or packets, can be transmitted for a certain number of repetitions, at regular intervals over a fixed period of time, until acoustic data transmission is terminated by a user (e.g., by actuating a switch that ceases acoustic data transmission), or the like. The repeated transmission of acoustic signal data may be useful, for example, when the acoustic signal data are providing an encoded representation of an error code or other diagnostic that is pertinent to the safe and/or correct operation of the power tool device 102.

The acoustic signal data may also encode other information or message. For example, the acoustic signal data could indicate an alert as a call for help, a request for assistance, a request for ordering more of a particular consumable (fasteners, materials, etc.), a request for additional tools needed on a jobsite, and so on.

The acoustic signal data transmitted by the electronic components 370 (e.g., FETs, MOSFETs) of the power tool device 102 may also include a checksum, parity check, or other verification data, which may be added to the acoustic signal data by the electronic processor 330 before the acoustic signal data are transmitted.

Additionally or alternatively, the acoustic signal data generated by the electronic components 370 (e.g., FETs, MOSFETs) of the power tool device 102 may be modulated in a way that indicates a relative use of the power tool device 102 relative to other power tool devices 102. For example, tool crib owners may want to know the frequency that a particular power tool is being used relative to others in an inventory. In these instances, a pulse-width modulation ("PWM") or other characteristic of sound generated may be associated with the relative tool use (e.g., by varying the characteristics of the sound being generated by the FETs and/or MOSFETs based on the relative use frequency of the power tool or other power tool device).

In some embodiments, the acoustic signal data include a message or other information for facilitating wireless pairing of the power tool device 102 with the external device 104. Often, there are multiple power tool devices that can be wirelessly paired when a user wants to connect to a particular power tool device. Having a desired power tool device 102 "chirp" a characteristic signal can aid the pairing process (e.g., when otherwise trying to pair the external device 104 with the power tool device 102 via Bluetooth®). The "chirping" in this instance can also help improve overall security because this additional layer of confirmation can be harder for a malicious actor to intercept.

The "chirping" can also encode or indicate an identity of the power tool device 102 and, thus, be used to more quickly identify which power tool device 102 is which when a user wants to connect, read, interact, etc., with a particular power tool device. This can be especially useful for tool crib managers that may have a plurality of the same type of power tool, but want to customize, check-in, check-out, lock, etc., the power tool device they are holding.

Additionally or alternatively, power tool devices 102 can "chirp" to state their presence (e.g., when placed in a crib or tool box). For example, the "chirping" can encode or indicate an identity of the power tool device 102. The chirping can be especially useful in a tool crib where chirping, especially with brief statements and lots of otherwise silence, can be effective for identifying the presence of a given power tool device (among other information).

Figure 5:
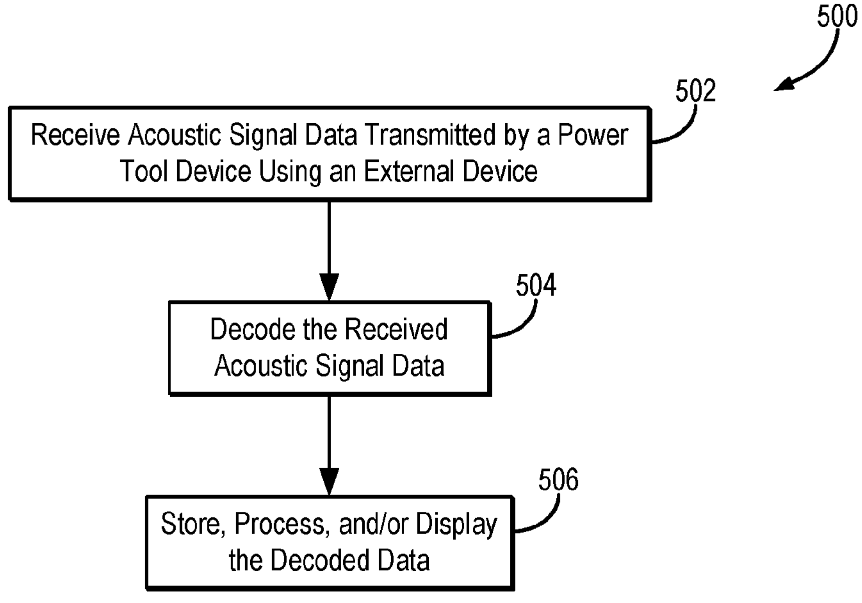
FIG. 5 is a flowchart illustrating a method of receiving acoustic signal data with an external device, where the acoustic signal data were transmitted by a power tool device.

FIG. 5 is a flowchart illustrating a process 500 of receiving, by an external device 104, acoustic signal data that have been transmitted by modulating the switching frequency of electronic components (e.g., FETs, MOSFETs) of a power tool device 102 (e.g., according to process 400) and decoding, storing, transmitting, displaying, and/or otherwise processing the received data.

The acoustic signal data transmitted by the power tool device 102 (e.g., according to process 400) are received by the external device 104, as indicated at step 502. For example, the external device 104 can detect acoustic signals generated by one or more electronic components 370 of the power tool device 102. As a more particular example, a microphone of the external device 104 may detect the acoustic signals, convert the acoustic signals to electric signals (e.g., analog or digital), and provide the electric signals to an electronic processor of the external device 104.

At step 504, the received acoustic signal data are then decoded by an electronic processor of the external device 104. For example, a suitable decoding technique can be used to decode the acoustic signal data that were encoded according to a particular encoding scheme by the electronic processor 330 of the power tool device 102.

In some other embodiments, the received acoustic signal data are not decoded by the electronic processor of the external device 104 and instead the encoded data are stored in a memory of the external device 104 or are transmitted on to another device, such as a server 106 or another power tool device via a wired or wireless connection. In cases in which the encoded data is transmitted, the server 106 or other power tool device that receives the encoded data may perform steps 504 and/or 506.

At step 506, the decoded data are then stored in a memory of the external device 104. Additionally or alternatively, the decoded data can be processed by an electronic processor of the external device 104 in order to generate a display to a user (e.g., an alert corresponding to an error message received from the power tool device 102 in the acoustic signal data). It still other instances, the decoded data can be transmitted by the external device 104 to the server 106 and/or another power tool device. For example, the decoded data can be transmitted to the server 106 via a wireless connection (either directly, or indirectly via the network 108) or a wired connection. As a non-limiting example, the decoded data can indicate a serial number of the power tool device 102, and the decoded data can be transmitted to the external device 104 (e.g., a smartphone) where the serial number of the power tool device 102 can be displayed to a user.

In some embodiments, the external device 104 can, in addition to detecting acoustic signatures at the switching frequency or switching frequencies, can also employ listening techniques for other characteristic sounds of power tool devices. Other characteristic sounds could include detection of a power tool based on its general operational sound (e.g., table saw cutting, drill drilling (including specific bit type), screwdriver screwing, the general loading sound giving indication of the application speed, rotary hammer hammering, a hammer nailing, a stapler stapling, a nailer firing, etc.). Additionally or alternatively, these power tool devices can be operated to generate additional acoustic signatures that can help differentiate the power tool devices based on the acoustic detection of the external device 104. For example, a power tool can have an internal resonator that vibrates at a specific frequency during or after use, and/or a power tool can have a structural form designed to vibrate at a specific frequency or manner during or after user.

Figure 6:
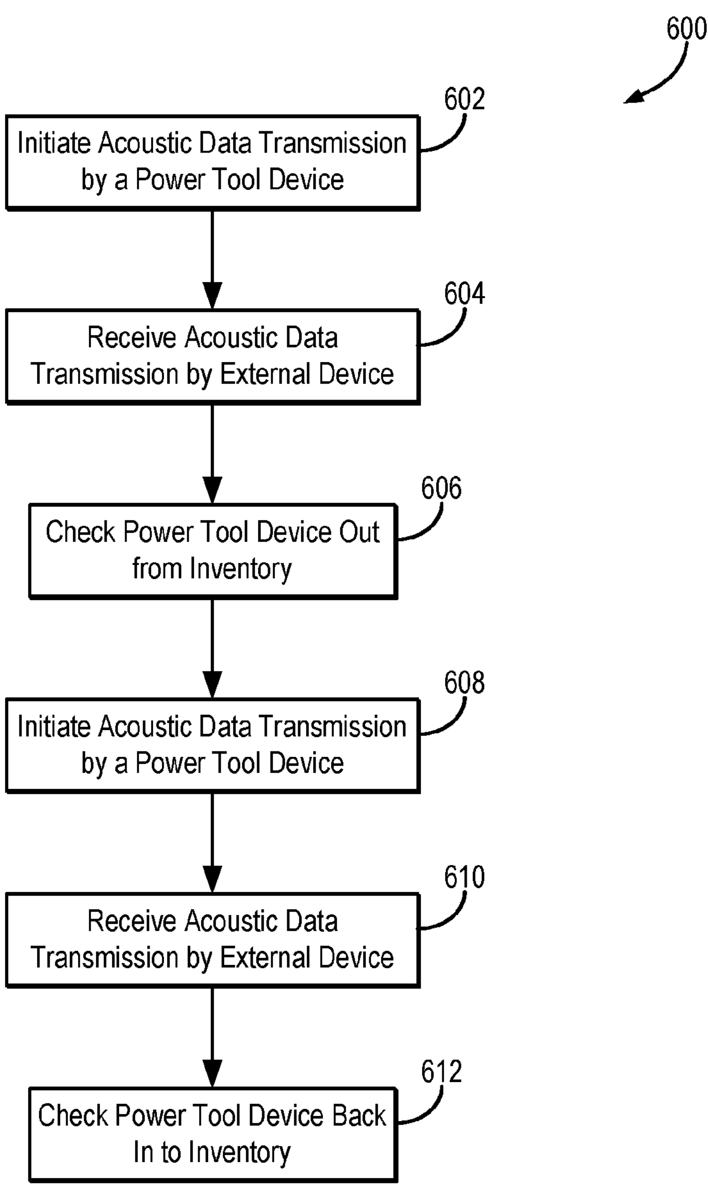
FIG. 6 is a flowchart illustrating a method of power tool device inventory management based on acoustic data transmission from power tool devices within the inventory.

FIG. 6 illustrates a process 600 of managing an inventory of power tools or power tool devices using acoustic data transmission by controlling electronics (e.g., FETs, MOSFETs) of the power tool devices to generate acoustic signals at one or more switching frequencies, or the like.

One of the primary goals of a tool crib manager is to keep track of what tools are checked in and out. This can be done with QR codes and scanners as well as more automated ways such as with wireless "pings" by tools that when heard check the tool in and when not heard check the tool out. Using the switching frequency detection for acoustic data transmission, a tool crib manager or user can quickly check a power tool device in or out of an inventory. For instance, at step 602, a user can initiate an acoustic data transmission from a power tool device 102 in order to check the power tool device 102 out of an inventory (e.g., a tool crib). The acoustic data transmission, which may be a chirp, an encoded message, or the like, is received by an external device 104 at step 604 and the received data packet is processed by the external device 104, or forwarded to a server 106 for processing, in order to check the power tool device 102 out from the inventory at step 606. Initiating the acoustic data transmission in step 602 and receiving the acoustic signal data in step 604 may, at least in some examples, be performed similar to steps 402 of FIG. 4 and step 502 (and potentially step 504) of FIG. 5, respectively. The inventory may, for example, be maintained by the external device 104 or the server 106 and include a database of power tool devices (e.g., organized by an identifier for each power tool device) with associated inventory data (e.g., checked-in/checked-out status, last known location, associated user, tool type, other forms of power tool data described herein, etc.). Accordingly, in block 606, the external device 104 or the server 106 may update the inventory to change the checked-in/checked-out status to "checked-out."

When the user is finished using the power tool device 102, it is returned to the inventory location (e.g., a tool crib)

where the user again initiates an acoustic data transmission at step 608. Now, the acoustic signal data indicate that the power tool device 102 is to be checked back into the inventory. The acoustic data are received by the external device at step 610 and processed (e.g., by the external device 104, the server 106, etc.) to check the power tool device back into the inventory, as indicated at step 612. Initiating the acoustic data transmission in step 608 and receiving the acoustic signal data in step 610 may, at least in some examples, be performed similar to steps 402 of FIG. 4 and step 502 (and potentially step 504) of FIG. 5, respectively. In step 612, the external device 104 or the server 106 may update the inventory to change the checked-in/checked-out status to “checked-in.”

As an example, by holding a power tool and causing it to emit sound (e.g., at low duty cycle so the power tool is just “buzzing”) the sound can be detected by an external device (e.g., a standalone microphone, a security camera having a microphone, or the like). The result is that the power tool device 102 can be checked out of the inventory, or checked back in if the power tool device 102 was initially checked out. In general, the buzzing check-in method may be faster than QR code scanning because the user may already be holding the power tool by its grip and can activate the trigger at a low duty cycle—or the tool may recognize being picked up (or recognize being held still after motion as if to be listened to).

As described above, in some embodiments the transmitted acoustic signal data may include a “chirp.” This chirping can state the presence of a power tool device (e.g., by encoding or otherwise indicating an identify of the power tool device). The chirping could be especially useful in a tool crib where chirping, especially with brief statements and otherwise substantial silence, could be effective for identifying the presence of a given power tool device within the tool crib (among other information). Having two or more microphones in the inventory location (for triangulation), tracking echoes (even with one microphone), and/or listening to the loudness of the signals can be used to pinpoint a location of a particular power tool device 102 in the inventory location.

Running the FETs can both expend battery life and, if done near continuously, may burn out the FETs. It also can cause high currents that may damage a battery. Thus, for inventory management purposes, power tool devices 102 in a tool crib or other inventory location can be configured to not continuously transmit acoustic signals. Rather, the power tool devices 102 can emit sounds at certain intervals (e.g., transmitting a brief chirp every 10 minutes, or the like). In some embodiments, a power tool device 102 can elect to disable extra switching frequency emission (e.g., by the electronic controller 320) based on the temperature of MOSFETs and other components, battery health, or battery state of charge.

As the switching frequency may be characteristic to power tool devices, security cameras and other security systems that have microphones can be used to monitor power tool devices in an inventory location. This can be used directly for analytics and also jobsite security purposes. A power tool device can be configured such that when it is detected that it is picked up, it may emit a switching frequency. If other security conditions are not satisfied (e.g., if the power tool device was not properly checked out of the inventory) then the power tool device 102 can emit acoustic signal data (e.g., using the method 400) that is received by the external device 104 (e.g., using method 500) and processed as a security alert. Other similar events such as drops, being used outside of normal hours, being used in an unexpected location, detection of improper use, attempted use while locked, etc., can all be used as triggers for such a switching frequency-based security alert.

Using the methods described in the present disclosure, a unique tool identification sound sequence can be generated (e.g., using process 400), which can be combined with inventory management solutions. As described above, the unique identification sequences can be programmed into firmware at manufacturing. In some instances, the unique identifier can be generated based on an algorithm. For example, at the time of manufacture, a power tool device 102 can have its serial number and digital serial identification recorded. An acoustic signature later generated by the power tool device 102 (e.g., using process 400) can then be received by an external device and processed (e.g., using process 500) to determine the unique sound identification sequence for the power tool device 102. A digital serial identification lookup can then be performed (e.g., by the external device 104 querying a server 106 or other database) to combine with inventory data. In this way, the current status of the power tool device 102 on a jobsite can be confirmed and/or logged.

This process can be advantageous for inferring the likelihood of usage of the power tool device 102. Combined with machine learning algorithms, the external device 104 and/or server 106 can provide tool suggestions for the inventory management. For instance, a machine learning or other artificial intelligence algorithm could process the usage data to suggest whether tools are available to be transferred to other owner sites based on low or no usage, etc. This can provide an increased efficiency of tool utilization across jobsites. The acoustic data transmission can be combined with other data transmissions, including EM signal transmission as described above. With electromagnetic radiation, digital serial identification data can be broadcast more reliably by defining a protocol for unique tool identification. Both switching and electromagnetic based data transmission can enable tool and usage tracking down to individual serial ID.

For example, a tool might have a serial number and/or one or more identifiers (secondary ID, tool model number, etc.). An algorithm can use the at least one identifier to select at least one property (e.g., frequency) to emit. It may be advantageous to use an algorithm that non-continuously assigned identifiers, such that if a user bought two tools with the same model number and had nearly consecutive serial numbers, the algorithm would produce significantly different frequencies or other defining characteristics for the acoustic signature.

In some embodiments, a power tool device can have different acoustic signatures for different usage states. For example, one acoustic signature may be generated for a power tool device that was recently used, and another for a power tool device that has not been used in a while. An algorithm might take in the recent use status again to make a sufficiently unique frequency or other defining characteristic.

In still other embodiments, the external device 104 may listen for a power tool device 102 and via the detected acoustic signature generated by the power tool device 102 the external device 104 can determine how to listed for the particular power tool device 102 (e.g., by determining a dominant switching frequency of the power tool device 102). This process can be used as a calibration step for the external device 104. In some instances, the user can initiate a calibration, or recalibration, of the external device 104 and/or power tool devices 102. Multiple power tool devices

102 may have some overlap in their switching frequencies. By using this calibration step, the external device 104 can better distinguish individual power tool devices 102 that may have overlapping switching frequency ranges. In some embodiments, the uncertainty in identifying different power tool devices 102 based on their overlapping switching frequencies can be displayed to the user (e.g., via the external device). Additionally or alternatively, other information can be presented to the user (e.g., last seen location of other power tool devices) in order to reduce this uncertainty for the user.

Figure 7:
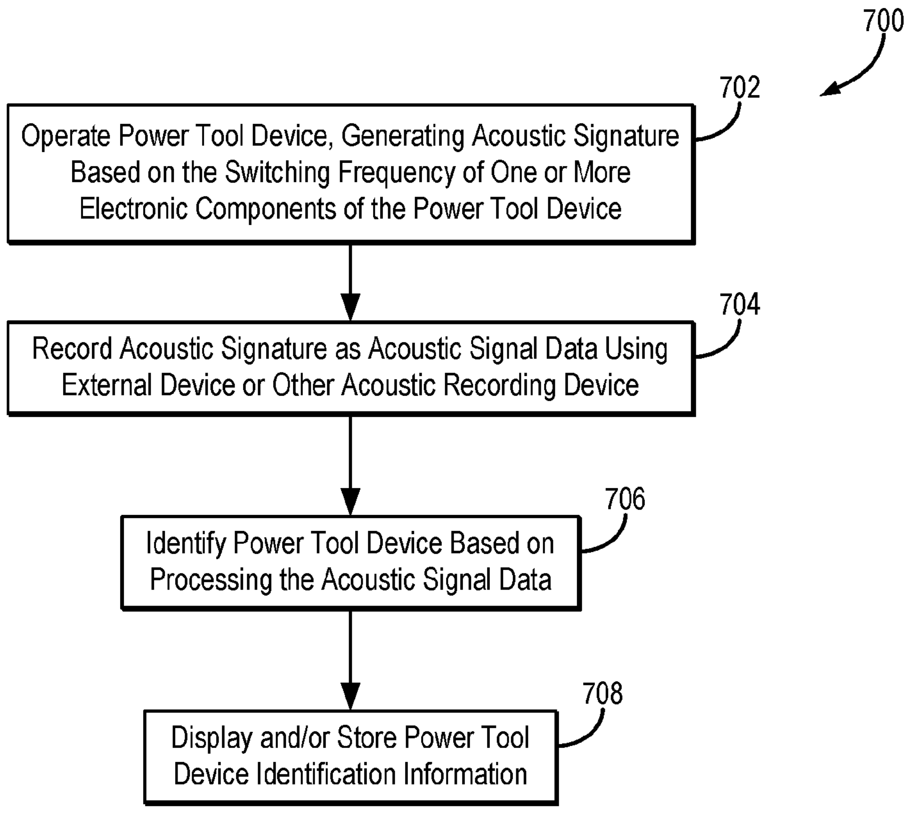
FIG. 7 is a flowchart illustrating a method for identifying a power tool device (e.g., a particular power tool device, a type of power tool device, a power tool device model, an owner of a power tool device, etc.) based on an acoustic signature generated by the switching frequency, or switching frequencies, of electronic component(s) of the power tool device.

FIG. 7 illustrates a process 700 of identifying a power tool device based on an acoustic signature generated by the switching frequency of one or more electronic components (e.g., transistors, semiconductor switched devices) of the power tool device.

The power tool device 102 is operated at process block 702. As a result of this operation, one or more electronic components of the power tool device 102 (e.g., FETS, MOSFETS, other transistors, semiconductor switched devices) will generate one or more switching frequencies. The switching frequency, or switching frequencies, create an acoustic signature. The acoustic signature may be generated in the audible range such that it can be discernable to a human user, or may be generated outside of the audible range such that it is imperceptible to a human user.

The acoustic signature generated by the electronic component(s) of the power tool device 102 are then recorded as acoustic signal data, as indicated at process block 704. For example, as described above, the external device 104 may have a microphone that can detect and record the acoustic signature generated by the electronic component(s) of the power tool device 102. In other embodiments, a device other than the external device 104 can detect and record the acoustic signature, such as another power tool device 102, a dedicated acoustic recording device, or the like. In those instances, the acoustic signal data recorded by detecting the acoustic signature can be transmitted to the external device 104 or to a server 106 for processing.

The acoustic signal data are then processed to identify the power tool device 102 that generated the acoustic signature, as indicated at process block 706. The acoustic signal data can be processed by the external device 104, or may be transmitted to a server 106 and the server 106 may process the acoustic signal data to identify the power tool device 102. Identifying the power tool device 102 can include identifying the specific power tool device 102 that generated the acoustic signature. Additionally or alternatively, identifying the power tool device 102 can include identifying the type of power tool device (e.g., a power drill versus an impact driver versus a reciprocating saw), identifying the model of power tool device, identifying an owner of the power tool device, or the like.

Information about the power tool device identification can then be stored or otherwise presented to a user, as indicated at process block 708. For instance, an identification of the power tool device can be displayed to a user (e.g., via external device 104). The identification may include a power tool device ID of the power tool device 102; a model of the power tool device 102; an owner ID of the power tool device 102; an identification of an inventory to which the power tool device 102 belongs or is otherwise associated with; whether the power tool device 102 is subject to a rental, lease, or other agreement; and the like. In some embodiments, the external device 104 can transmit the power tool device ID identified from the acoustic signature to a server 106 to retrieve additional information or data associated with the power tool device 102. For instance, the server 106 can query a database using the power tool device ID to retrieve power tool device data or other information associated with the power tool device 102.

It is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Some embodiments, including computerized implementations of methods according to the disclosure, can be implemented as a system, method, apparatus, or article of manufacture using standard programming or engineering techniques to produce software, firmware, hardware, or any combination thereof to control a processor device (e.g., a serial or parallel processor chip, a single- or multi-core chip, a microprocessor, a field programmable gate array, any variety of combinations of a control unit, arithmetic logic unit, and processor register, and so on), a computer (e.g., a processor device operatively coupled to a memory), or another electronically operated controller to implement aspects detailed herein. Accordingly, for example, embodiments of the disclosure can be implemented as a set of instructions, tangibly embodied on a non-transitory computer-readable media, such that a processor device can implement the instructions based upon reading the instructions from the computer-readable media. Some embodiments of the disclosure can include (or utilize) a control device such as an automation device, a computer including various computer hardware, software, firmware, and so on, consistent with the discussion below. As specific examples, a control device can include a processor, a microcontroller, a field-programmable gate array, a programmable logic controller, logic gates, etc., and other typical components that are known in the art for implementation of appropriate functionality (e.g., memory, communication systems, power sources, user interfaces and other inputs, etc.). Also, functions performed by multiple components may be consolidated and performed by a single component. Similarly, the functions described herein as being performed by one component may be performed by multiple components in a distributed manner. Additionally, a component described as performing particular functionality may also perform additional functionality not described herein. For example, a device or structure that is "configured" in a certain way is configured in at least that way, but may also be configured in ways that are not listed.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (e.g., hard disks, floppy disks), optical media (e.g., compact discs, digital video discs, Blu-ray discs), semiconductor media (e.g., random access memory ("RAM"), flash memory, electrically programmable read only memory ("EPROM"), electrically erasable programmable read only memory ("EEPROM")), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

The term "article of manufacture" as used herein is intended to encompass a computer program accessible from any computer-readable device, carrier (e.g., non-transitory signals), or media (e.g., non-transitory media). For example, computer-readable media can include but are not limited to magnetic storage devices (e.g., hard disk, floppy disk, magnetic strips, and so on), optical disks (e.g., compact disk ("CD"), digital versatile disk ("DVD"), and so on), smart cards, and flash memory devices (e.g., card, stick, and so on). Additionally, it should be appreciated that a carrier wave can be employed to carry computer-readable electronic data such as those used in transmitting and receiving electronic mail or in accessing a network such as the Internet or a local area network ("LAN"). Those skilled in the art will recognize that many modifications may be made to these configurations without departing from the scope or spirit of the claimed subject matter.

Certain operations of methods according to the disclosure, or of systems executing those methods, may be represented schematically in the figures or otherwise discussed herein. Unless otherwise specified or limited, representation in the figures of particular operations in particular spatial order may not necessarily require those operations to be executed in a particular sequence corresponding to the particular spatial order. Correspondingly, certain operations represented in the figures, or otherwise disclosed herein, can be executed in different orders than are expressly illustrated or described, as appropriate for particular embodiments of the disclosure. Further, in some embodiments, certain operations can be executed in parallel, including by dedicated parallel processing devices, or separate computing devices configured to interoperate as part of a large system.

As used herein in the context of computer implementation, unless otherwise specified or limited, the terms "component," "system," "module," and the like are intended to encompass part or all of computer-related systems that include hardware, software, a combination of hardware and software, or software in execution. For example, a component may be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) may reside within a process or thread of execution, may be localized on one computer, may be distributed between two or more computers or other processor devices, or may be included within another component (or system, module, and so on).

In some implementations, devices or systems disclosed herein can be utilized or installed using methods embodying aspects of the disclosure. Correspondingly, description herein of particular features, capabilities, or intended purposes of a device or system is generally intended to inherently include disclosure of a method of using such features for the intended purposes, a method of implementing such capabilities, and a method of installing disclosed (or otherwise known) components to support these purposes or capabilities. Similarly, unless otherwise indicated or limited, discussion herein of any method of manufacturing or using a particular device or system, including installing the device or system, is intended to inherently include disclosure, as embodiments of the disclosure, of the utilized features and implemented capabilities of such device or system.

As used herein, unless otherwise defined or limited, ordinal numbers are used herein for convenience of reference based generally on the order in which particular components are presented for the relevant part of the disclosure. In this regard, for example, designations such as "first," "second," etc., generally indicate only the order in which the relevant component is introduced for discussion and generally do not indicate or require a particular spatial arrangement, functional or structural primacy or order.

As used herein, unless otherwise defined or limited, directional terms are used for convenience of reference for discussion of particular figures or examples. For example, references to downward (or other) directions or top (or other) positions may be used to discuss aspects of a particular example or figure, but do not necessarily require similar orientation or geometry in all installations or configurations.

As used herein, unless otherwise defined or limited, the phase "and/or" used with two or more items is intended to cover the items individually and both items together. For example, a device having "a and/or b" is intended to cover: a device having a (but not b); a device having b (but not a); and a device having both a and b.

This discussion is presented to enable a person skilled in the art to make and use embodiments of the disclosure. Various modifications to the illustrated examples will be readily apparent to those skilled in the art, and the generic principles herein can be applied to other examples and applications without departing from the principles disclosed herein. Thus, embodiments of the disclosure are not intended to be limited to embodiments shown, but are to be accorded the widest scope consistent with the principles and features disclosed herein and the claims below. The provided detailed description is to be read with reference to the figures, in which like elements in different figures have like reference numerals. The figures, which are not necessarily to scale, depict selected examples and are not intended to limit the scope of the disclosure. Skilled artisans will recognize the examples provided herein have many useful alternatives and fall within the scope of the disclosure.

Various features and advantages of the disclosure are set forth in the following claims.

The invention claimed is:

1. A method for identifying a power tool device, the method comprising:

modulating a first switching frequency generated by an electronic component of the power tool device, thereby generating an acoustic signature;

receiving, by an external device, acoustic signal data by detecting the acoustic signature generated by modulating the first switching frequency generated by the electronic component of the power tool device; and processing the received acoustic signal data by a processor of the external device to determine the acoustic signature, thereby identifying the power tool device by its acoustic signature, wherein the power tool emits a second switching frequency during operation.

2. The method of claim 1, wherein the power tool device comprises a power tool.

3. The method of claim 1, wherein the power tool device comprises a power tool battery charger.

4. The method of claim 1, wherein the electronic component comprises at least one field-effect transistor (FET).

5. The method of claim 4, wherein the FET is a metal-oxide-semiconductor field-effect transistor (MOSFET).

6. The method of claim 1, wherein the external device comprises a microphone.

7. The method of claim 6, wherein the microphone is coupled to a mobile device.

8. The method of claim 6, wherein the microphone is coupled to a security camera.

9. The method of claim 6, wherein the microphone is coupled to another power tool device.

10. The method of claim 6, wherein the microphone is coupled to at least one of a network hub or a gateway device.

11. The method of claim 6, wherein the electronic component has a primary function that is different from acoustic data transmission.

12. The method of claim 1, wherein the electronic component of the power tool device emits the acoustic signature.

13. The method of claim 1, wherein the second switching frequency corresponds to a performance of the power tool device.

14. A method for transmitting data using a power tool device, the method comprising:

transmitting data stored in a memory of the power tool device as acoustic signal data by modulating a first switching frequency generated by an electronic component of the power tool device, thereby generating an acoustic signature;

receiving, by an external device, the acoustic signal data by detecting the acoustic signature generated by modulating the first switching frequency generated by the electronic component of the power tool device; and storing the received acoustic signal data in a memory of the external device, wherein the power tool emits a second switching frequency during operation.

15. The method of claim 14, wherein transmitting the data stored in the memory of the power tool device as acoustic signal data comprises:

accessing the data from the memory of the power tool device;

encoding the data using an electronic processor of the power tool device, generating encoded data that include control parameters for modulating the first switching frequency generated by the electronic component; and transmitting the acoustic signal data using the electronic processor to modulate the first switching frequency generated by the electronic component based on the control parameters in the encoded data, thereby causing the electronic component to emit the acoustic signature.

16. The method of claim 15, wherein encoding the data using the electronic processor comprises encoding the data using a binary encoding.

17. The method of claim 15, wherein the control parameters indicate an analog modulation of the first switching frequency.

18. The method of claim 15, wherein the control parameters indicate a digital modulation of the first switching frequency.

19. The method of claim 15, wherein the control parameters indicate modulating an amplitude of the acoustic signature generated by the electronic component.

20. A power tool device comprising:

a housing;

an electronic component housed within the housing;

an electronic processor coupled to the electronic component, the electronic processor being configured to control the electronic component to modulate a first switching frequency of the electronic component, such that in response to modulating the electronic component a sound having an acoustic signature based on the modulation of the first switching frequency is emitted, wherein the power tool device emits a second switching frequency during operation.

21. The power tool device of claim 20, wherein the electronic component is a bridge for controlling operation of a motor.

22. The power tool device of claim 20, wherein the electronic component comprises at least one field effect transistor (FET).

23. The power tool device of claim 22, wherein the at least one FET comprises a metal-oxide-semiconductor FET.

24. The power tool device of claim 20, wherein the electronic component emits the sound.

* * * * *